US012075323B2

(12) United States Patent
Oba et al.

(10) Patent No.: US 12,075,323 B2
(45) Date of Patent: Aug. 27, 2024

(54) INFORMATION PROCESSING DEVICE, TERMINAL DEVICE, AND INFORMATION PROCESSING METHOD

(71) Applicant: SONY SEMICONDUCTOR SOLUTIONS CORPORATION, Kanagawa (JP)

(72) Inventors: Eiji Oba, Kanagawa (JP); Hideo Okamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 614 days.

(21) Appl. No.: 17/250,566

(22) PCT Filed: Aug. 2, 2019

(86) PCT No.: PCT/JP2019/030612
§ 371 (c)(1),
(2) Date: Feb. 3, 2021

(87) PCT Pub. No.: WO2020/031924
PCT Pub. Date: Feb. 13, 2020

(65) Prior Publication Data
US 2021/0297839 A1    Sep. 23, 2021

(30) Foreign Application Priority Data

Aug. 10, 2018    (JP) .................................. 2018-152088

(51) Int. Cl.
*H04W 4/90*    (2018.01)
*G08B 21/10*    (2006.01)
(Continued)

(52) U.S. Cl.
CPC .............. *H04W 4/90* (2018.02); *G08B 21/10* (2013.01); *G08B 25/08* (2013.01); *G08B 25/10* (2013.01);
(Continued)

(58) Field of Classification Search
CPC ..... H04W 4/90; H04W 28/0268; H04W 4/80; H04W 4/40; G08B 21/10; G08B 25/08;
(Continued)

(56) References Cited

U.S. PATENT DOCUMENTS

2008/0079597 A1    4/2008  Tambascio
2008/0132199 A1*   6/2008  Hirata .................. G08B 25/016
                                                        455/404.2
(Continued)

FOREIGN PATENT DOCUMENTS

CN    101221446 A    7/2008
CN    101710443 A    5/2010
(Continued)

OTHER PUBLICATIONS

Karanjit S. Siyan, Chinese Windows 2000 Server Professional Reference, Sep. 30, 2001, Mechanical Industry Press, 40 pages.
(Continued)

*Primary Examiner* — Maria El-Zoobi
(74) *Attorney, Agent, or Firm* — CHIP LAW GROUP

(57) ABSTRACT

An information processing device according to an embodiment includes a detection unit that detects an event. The information processing device further includes a determination unit that determines a level of the event detected by the detection unit. The information processing device further includes a transmission unit that transmits information according to the level determined by the determination unit to a first communication device.

18 Claims, 16 Drawing Sheets

(51) Int. Cl.
  *G08B 25/08* (2006.01)
  *G08B 25/10* (2006.01)
  *H04M 11/04* (2006.01)
  *H04W 28/02* (2009.01)

(52) U.S. Cl.
  CPC ....... *H04M 11/04* (2013.01); *H04W 28/0268* (2013.01)

(58) Field of Classification Search
  CPC .... G08B 25/10; G08B 25/016; G08B 25/001; H04M 11/04; H04M 11/025; G08G 1/0112; G08G 1/0133; G08G 1/04; G08G 1/012
  USPC ....................................................... 455/404.1
  See application file for complete search history.

(56) References Cited

U.S. PATENT DOCUMENTS

| | | | | |
|---|---|---|---|---|
| 2011/0238861 | A1* | 9/2011 | Hutchinson | G06F 9/54 719/314 |
| 2014/0085477 | A1 | 3/2014 | Takano et al. | |
| 2015/0061895 | A1* | 3/2015 | Ricci | G06V 40/28 340/902 |
| 2015/0191176 | A1* | 7/2015 | Kobana | B60W 50/12 701/70 |
| 2016/0094964 | A1* | 3/2016 | Barfield, Jr. | H04W 4/90 340/870.07 |
| 2016/0323741 | A1* | 11/2016 | Lee | H04W 12/06 |
| 2017/0086048 | A1* | 3/2017 | Cho | B64F 1/10 |
| 2017/0352259 | A1* | 12/2017 | Bruck | F24F 11/30 |

FOREIGN PATENT DOCUMENTS

| | | | | |
|---|---|---|---|---|
| CN | 202102550 | U | 1/2012 | |
| CN | 103548340 | A | 1/2014 | |
| CN | 203450058 | U | 2/2014 | |
| CN | 103794029 | A | 5/2014 | |
| CN | 104064004 | A | 9/2014 | |
| CN | 204904358 | U | 12/2015 | |
| CN | 205582211 | U | 9/2016 | |
| CN | 205910570 | U | 1/2017 | |
| CN | 106777365 | A | 5/2017 | |
| CN | 106874415 | A | 6/2017 | |
| CN | 107025778 | A | 8/2017 | |
| CN | 107544972 | A | 1/2018 | |
| EP | 2717571 | A1 | 4/2014 | |
| JP | 2003-067875 | A | 3/2003 | |
| JP | WO2012160902 | * | 12/2012 | ............... H04N 7/18 |
| JP | 2013-222216 | A | 10/2013 | |
| JP | 2014-010496 | A | 1/2014 | |
| JP | 2017215915 | * | 7/2017 | ............ G08B 25/08 |
| JP | 2017-215915 | A | 12/2017 | |
| WO | 2012/160902 | A1 | 11/2012 | |
| WO | WO-2018110151 | A1 | 6/2018 | |

OTHER PUBLICATIONS

Peng Wei, Research on Broadcast and Routing Techniques in a Mobile Ad Hoc Networks, Apr. 30, 2005, National Defense Science and Technology University Press, 27 pages.

International Search Report and Written Opinion of PCT Application No. PCT/JP2019/030612, issued on Oct. 29, 2019, 10 pages of ISRWO.

* cited by examiner

FIG.8A

| PACKET TYPE(SOS PACKET) | | |
|---|---|---|
| LEVEL | HOP COUNT | |
| ID | | |
| TYPE | POSITION INFORMATION | TIME INFORMATION |

FIG.8B

| PACKET TYPE(SOS PACKET) | | |
|---|---|---|
| LEVEL | HOP COUNT | |
| ID | | |
| TYPE | POSITION INFORMATION | TIME INFORMATION |
| TYPE | POSITION INFORMATION | TIME INFORMATION |
| TYPE | POSITION INFORMATION | TIME INFORMATION |
| ⋮ | ⋮ | ⋮ |

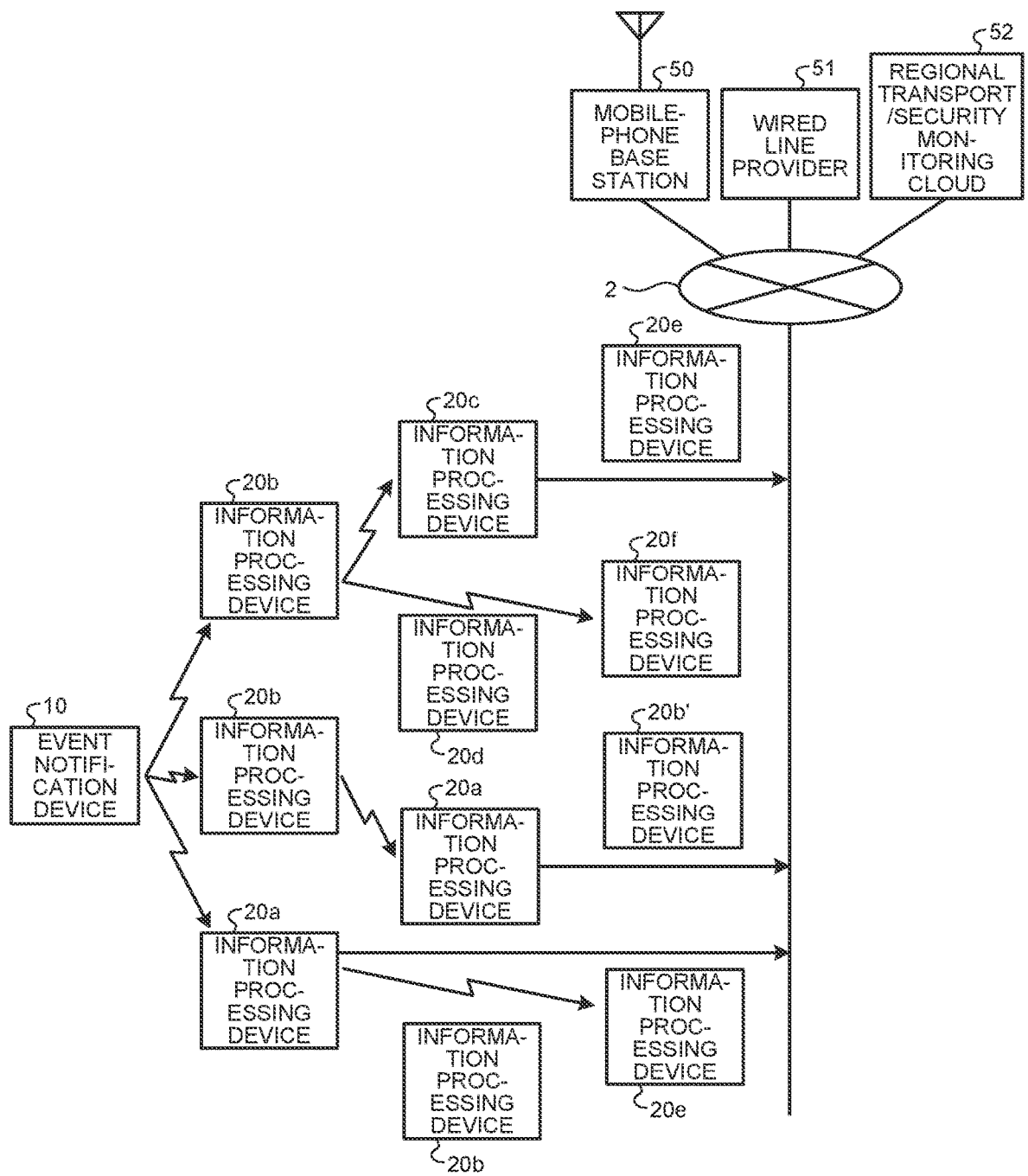

INFORMATION PROCESSING DEVICE, TERMINAL DEVICE, AND INFORMATION PROCESSING METHOD

CROSS REFERENCE TO RELATED APPLICATIONS

This application is a U.S. National Phase of International Patent Application No. PCT/JP2019/030612 filed on Aug. 2, 2019, which claims priority benefit of Japanese Patent Application No. JP 2018-152088 filed in the Japan Patent Office on Aug. 10, 2018. Each of the above-referenced applications is hereby incorporated herein by reference in its entirety.

FIELD

The present invention relates to an information processing device, a terminal device, an information processing method, and an information processing program.

BACKGROUND

In recent years, development of autonomous vehicles that is automatically driven according to autonomous control of the vehicles has progressed. Such an autonomous vehicle partly releases a driver from the driving operations, but it is assumed that the driving without the driver may cause an accident. Such an accident may include a traffic accident happens on the rear or lateral side, in addition to an accident induced by the host vehicle itself. Furthermore, even if the autonomous vehicles are widely spread, it is conceivable that both of traditional non-autonomous vehicles and the autonomous vehicles will run together, and thus, even if no serious accident is caused, an incident such as abnormal approach of another vehicle may occur.

CITATION LIST

Patent Literature

Patent Literature 1: JP 2014-010496 A

SUMMARY

Technical Problem

It can be considered that recording information on such a traffic accident or incident that an autonomous vehicle may encounter can be made more effectively by utilizing devices around the autonomous vehicle having imaging functions than by the autonomous vehicle alone. Therefore, there is a demand for a technology that makes it possible to use devices positioned around a party concerned.

The present disclosure proposes an information processing device, a terminal device, an information processing method, and an information processing program that make it possible to use information devices positioned around a party concerned.

Solution to Problem or solving the problem described above, an information processing device according to one aspect of the present disclosure has a detection unit that detects an event, a determination unit that determines a level of an event detected by the detection unit, and a transmission unit that transmits information according to the level determined by the determination unit to a first communication device.

BRIEF DESCRIPTION OF DRAWINGS

FIG. 8A is a diagram illustrating a configuration example of an SOS packet according to an embodiment.

FIG. 8B is a diagram illustrating a configuration example of an SOS packet according to an embodiment.

FIG. 12A is a diagram illustrating an example of connection to information processing devices and a regional transport/security monitoring cloud, applicable to an embodiment.

DESCRIPTION OF EMBODIMENTS

Embodiments of the present disclosure will be described in detail below with reference to the drawings. Note that in each of the following embodiments, the same portions are denoted by the same reference symbols, and redundant description thereof will be omitted.

Outline of Information Processing System According to Embodiment

An information processing system according to an embodiment includes an event notification device that transmits information in response to an event, and in the information processing system, the information transmitted from the event notification device is received by a first communication device. The first communication device adds information about the device itself to the received information, following an instruction included in the received information and transmits the information to a second communication device. In other words, the information is relayed from the event notification device by the first communication device and transmitted to the second communication device. This reception and transmission can be repeated up to a predetermined number of times. The information is finally stored in a regional server that accumulates information about the region or a server on a cloud network.

Furthermore, the event notification device, the first communication device, and the second communication device that include imaging units are configured to store or transmit a captured image (e.g., moving image) in response to the reception of the information. This image is transmitted by broadcasting similarly to the information. In addition thereto, this image can also be transmitted, for example, to the above-mentioned regional server or server on the cloud network as a destination.

Information is transmitted over a relatively short distance as a communication range using a communication method such as broadcasting that does not specify an address. Therefore, information transmitted from one event notification device or communication device may be received by a plurality of communication devices existing within a predetermined distance from the transmission source. Therefore, the information including an image relayed by a communication device positioned in the vicinity of the event notification device upon occurrence of the event is stored, for example, in the regional server. This makes it possible to analyze a situation relating to the event from the image captured by each communication device, on the basis of the time when the event occurs.

Figure 1:
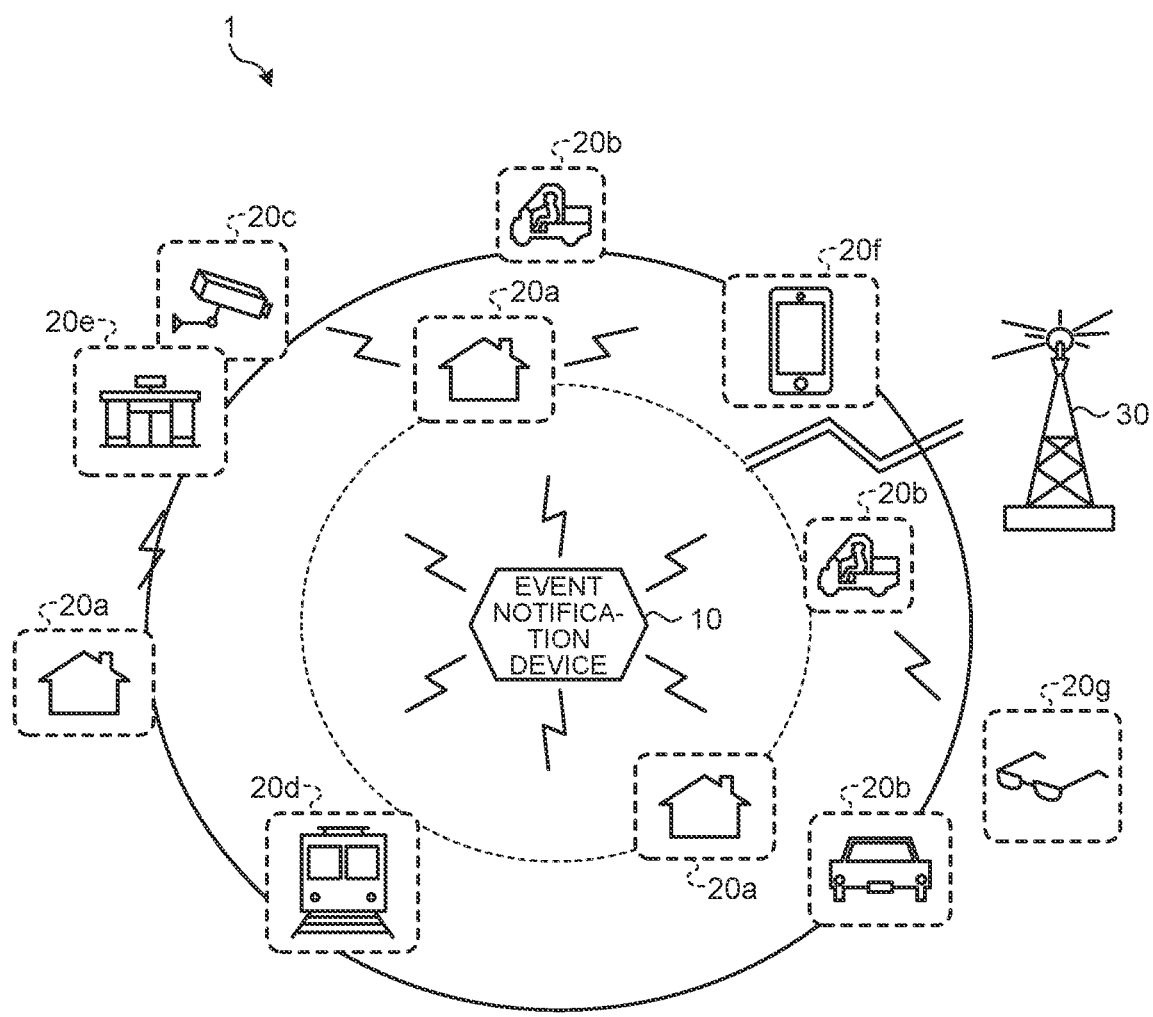
FIG. 1 is a diagram schematically illustrating an information processing system according to an embodiment.

FIG. 1 is a diagram schematically illustrating an information processing system according to an embodiment. In FIG. 1, an information processing system 1 includes an event notification device 10 and information processing devices 20a to 20g. The event notification device 10 transmits information in response to a user's operation or automatic identification upon occurrence of an event of some kind. Here, the event includes, for example, an event that may injure the user or causes the user to feel suspicious, but the content thereof is not particularly limited. In the case of user's operation, information may be transmitted on the basis of the subjectivity of the user.

The event notification device 10 can include a device mounted to a mobile object such as a vehicle and can have an imaging function for capturing images of the front/rear and left/right sides of the vehicle in a traveling direction. In this configuration, the event notification device 10 is configured to analyze a captured image to detect as an incident abnormal approaching of another vehicle to the host vehicle, such as pulling over, or tailgating from behind. Furthermore, analysis of an image obtained by imaging the right/left or rear side of the vehicle, detection of an impact on the vehicle body, or the like makes it possible to detect a traffic accident that happens on the rear or right/left side. The event notification device 10 transmits information when an incident or accident is detected. In addition thereto, the event notification device 10 can also be configured to transmit information in response to the user's operation. Furthermore, the event notification device 10 is configured to transmit an image captured by the imaging function in response to the detection of an event.

As the event notification device 10, a security notification device held by the user can be employed. The event notification device 10 as the security notification device is configured to regard predetermined operation by the user holding the event notification device 10 as detection of an event and transmit information. Furthermore, the event notification device 10 can also be configured to transmit information in response to an event not intended by the user, such as destruction of the event notification device 10. Furthermore, the event notification device 10 can have an imaging function, and thereby an image captured by the imaging function can be transmitted in response to detection of an event.

In an embodiment, both of the event notification device 10 as an in-vehicle device and the event notification device 10 as the security notification device, which are described above, transmit information first in response to the detection of an event and then transmit an image. Thus, the event notification device 10 can more reliably transmit information.

Note that the information transmitted by the event notification device 10 in response to the detection of an event can be considered as information indicating that the user relating to the event notification device 10 may encounter a dangerous situation. Therefore, in the following description, information transmitted by the event notification device 10 in response to the detection of an event is referred to as an SOS request. In other words, the SOS request represents a relief request made to request some kind of relief by a party concerned sending the SOS request.

In addition, the event notification device 10 transmits the SOS request by a communication method specifying no destination address. For example, the event notification device 10 is configured to transmit the SOS request by broadcast communication in general data communication. In addition thereto, the event notification device 10 can be also configured to transmit the SOS request by a method such as radio broadcasting. The SOS request is transmitted as packet information. A packet for transmitting the SOS request is called an SOS packet.

Furthermore, as a communication method using the event notification device 10 to mainly transmit, for example, an SOS packet for crime prevention, a communication method for communication over a relatively short distance (several meters to several tens of meters) is preferably employed. Application of such a communication method makes it possible to use the event notification device 10 for a long time without changing a battery, and the event notification device 10 can be operated for a long period of time. For such a communication method, Bluetooth (registered trademark) low energy (hereinafter, BLE) or the like can be applied. The communication method is not limited to this, and a wireless local area network (LAN) assuming a device positioned in the vicinity of the event notification device 10 as a communication target can also be applied. Note that in a case where the event notification device 10 is applied to a device, such as an in-vehicle device or a mobile phone terminal, that can receive power supply relatively frequently or continuously, it is not always necessary to give priority to a radio wave form used.

Here, in a radiotelephone communication network, radio waves in the same frequency band are simultaneously used by a large number of mobile phone terminals or the like in a time-division manner, and thereby a delay time may occur before communication is established, in some cases. Furthermore, in some cases, the event notification device 10 may be applied to a device, such as an in-vehicle device, that cannot use short-range communication enabling pairing while traveling. In such a case, there may be a need for transmission of urgent information, including an event, such as a fallen object or rock on a road, or a depression in a road or a dangerous act, such as tailgating, which a running vehicle of the user holding the event notification device 10 encounters. Therefore, it can be considered that the event notification device 10 includes a radiotelephone communication network that is appropriately selected from a local dynamic map (LDM) update communication network, which is currently being put into practical use, an existing third-generation mobile communication system (3G), fourth-generation mobile communication system (4G), and 5G that is a next-generation mobile communication system following 4G.

In FIG. 1, the information processing devices 20a to 20g each have an imaging function and a communication function. Depending on the uses of the information processing devices 20a to 20g, each of the information processing devices 20a to 20g performs constant imaging, imaging according to the operation of a user of each of the information processing devices 20a to 20g, or imaging according to some kind of action taken by someone other than the user of each of the information processing devices 20a to 20g. An image to be captured may be either a moving image or a still image. Furthermore, the information processing devices 20a to 20g may include a device having no imaging function.

Furthermore, each of the information processing devices 20a to 20g has a communication function to receive an SOS packet and an image that are transmitted from the event notification device 10 without specifying an address and transmit the received SOS packet and image to another information processing devices or the like.

In the example of FIG. 1, an information processing device 20a is a door phone provided at an entrance of a building such as a house. An information processing device 20b is a dashboard camera or event data recorder (EDR) mounted on a mobile object such as a vehicle. Note that a normal EDR is configured as a dashboard camera that acquires information in front of a vehicle. Here, information from all directions is important especially for a vehicle configured to require no intervention of a driver, such as an autonomous vehicle, and cameras are provided individually on the front, rear, left, and right sides of the vehicle. In this configuration, imaging an event occurrence point from a front and rear sides enables to obtain more event information usable for remote event analysis, from a higher perspective. An example of a usage form of this configuration will be described later.

An information processing device 20c is, for example, a security camera provided on a street. An information processing device 20d is, for example, a security camera installed on public transportation. An information processing device 20e is a security camera installed in a predetermined building such as a convenience store. An information processing device 20f is, for example, a nomad device held by an individual. The nomad device is an information processing device carried and used by an individual and is, for example, a multifunctional mobile phone terminal (smartphone) or a tablet personal computer. Furthermore, the information processing device 20f is, for example, a wearable terminal device worn and used by an individual.

Each of the information processing devices 20a to 20f exemplified in FIG. 1 has an imaging function and further has a communication function for receiving an SOS packet and an image transmitted from the event notification device 10. Furthermore, the information processing devices 20a, 20c, 20d and 20e of the information processing devices 20a to 20f can each include a communication function for wired communication. Recent transmission using wired communication has increasing capacity and speed in optical communication network, and it can be said that wired communication is more suitable for transmission of moving image information having a large amount of information than wireless communication. Therefore, information to be transmitted may be appropriately passed to a node having a connection to wired communication and may be preferentially transmitted to a wired network and stored.

In FIG. 1, a base station 30 is, for example, a wireless communication facility corresponding to wireless communication by each of the information processing devices 20a to 20f, and the base station 30 is connected to a network. For example, the base station 30 is configured to transmit received information to a server on the network.

In the information processing system 1 according to an embodiment as configured in this way, an SOS packet transmitted from the event notification device 10 is received by, for example, the information processing device 20a. The information processing device 20a increments by 1 a value indicating a hop count contained in the SOS packet received and adds information indicating itself (type, position information, etc.) and information indicating the current time to the SOS packet, and broadcasts the SOS packet. The SOS packet transmitted from the information processing device 20a is received by, for example, the information processing devices 20c and 20f. Each of these information processing devices 20c and 20f receiving the SOS packet adds its own information and time information to the SOS packet, increments the hop count by 1, and broadcasts the SOS packet, as in the information processing device 20a described above.

In other words, the SOS packet transmitted from the event notification device 10 is sequentially relayed and transmitted to other information processing devices, and predetermined information is added and the hop count is incremented while the SOS packet passes through the information processing devices. This relay transmission process is continued until, for example, the hop count reaches a predetermined value.

Furthermore, the event notification device 10 is configured to capture an image by using the imaging function when transmitting the SOS packet. The captured image is transmitted from the event notification device 10 after transmission of the SOS packet. The event notification device 10 is configured to transmit an image without specifying a destination address, as in the SOS packet. Conversely, the image may be transmitted by specifying the destination address. In this case, for example, the image transmitted from the event notification device 10 is transmitted to the specified address via the base station 30.

Here, assuming limited information transmission to the specified address, priority is given to a process of establishing transmission/reception with the specified address, and there may be a possibility of missing an opportunity of transmission of the SOS packet while waiting for the establishment of communication with the specified address. As a countermeasure, the SOS packet is once transmitted to an unspecified number of nodes that can be receivers and serve as relay points of relay transmission, prior to the establishment of transmission/reception. In addition thereto, in a situation where information transmission having low latency and short waiting time, including a communication method that aims to transmit sound without interruption, is available, such as voice over long term evolution (VOLTE), the SOS packet or the like may be transmitted/received to the specified address from the beginning.

More Specific Examples of Information Processing System According to Embodiment

Figure 2:
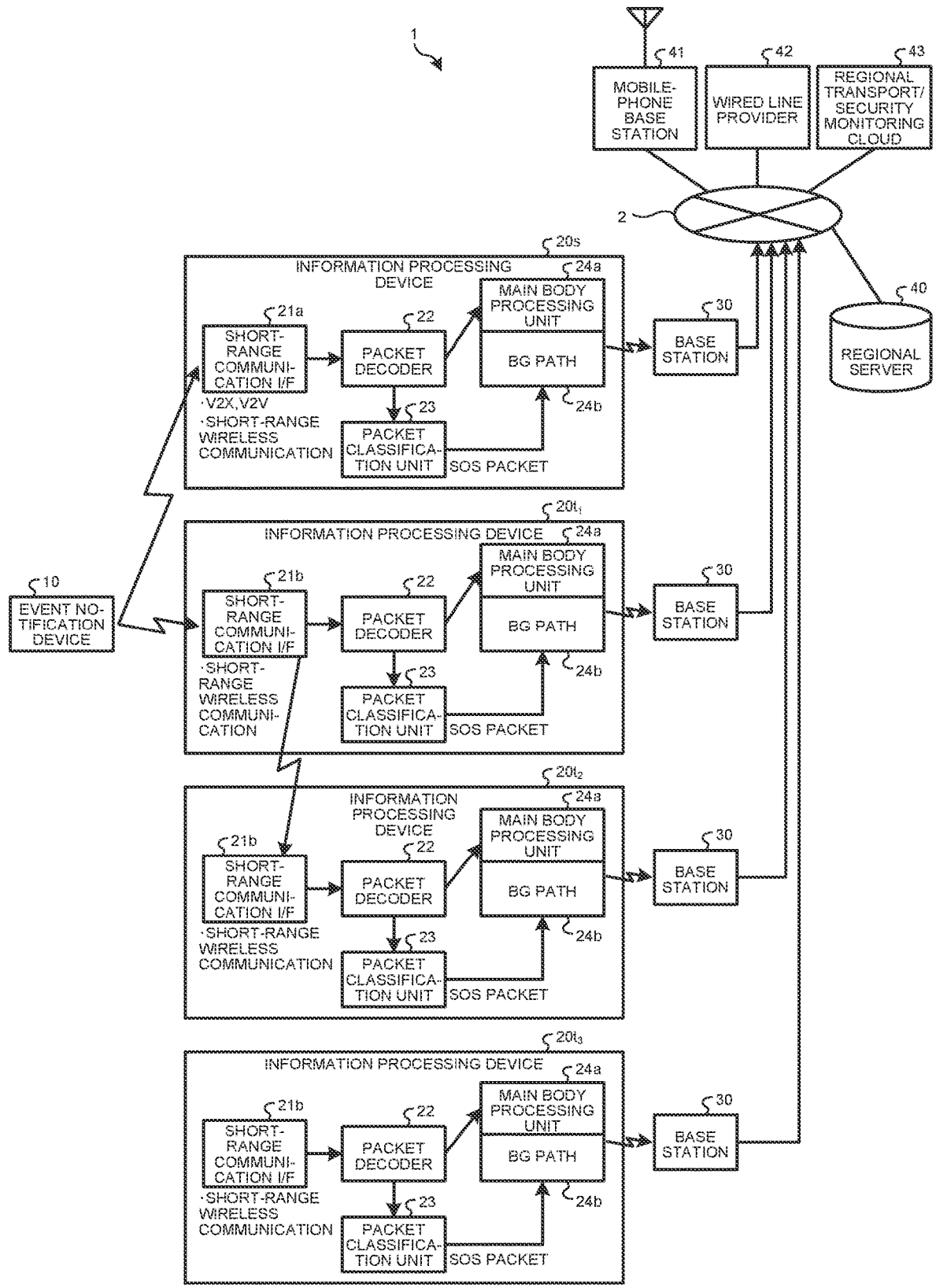
FIG. 2 is a block diagram more specifically illustrating a configuration of an information processing system according to an embodiment.

Next, the information processing system 1 according to an embodiment will be described more specifically. FIG. 2 is a block diagram more specifically illustrating the configuration of the information processing system 1 according to an embodiment. In FIG. 2, information processing devices 20s, $20t_1$, $20t_2$, and $20t_3$ are schematically illustrated in terms of communication functions.

In FIG. 2, the information processing device 20s is, for example, part of a control system mounted on an autonomous vehicle or a nomad device mounted on a vehicle, and the information processing device 20s corresponds to short-range wireless communication (e.g., BLE, wireless LAN, etc.) within a relatively short communication range and also corresponds to a communication method for inter-vehicle communication or road vehicle communication, such as vehicle to vehicle (V2V) communication or vehicle to X (V2X) communication. The information processing device 20s can correspond to, for example, the information processing device 20b of FIG. 1.

The information processing device 20s includes a short-range communication I/F 21a, a packet decoder 22, a packet classification unit 23, a main body processing unit 24a, and a background (BG) path 24b. The main body processing unit 24a performs wireless communication by a communication method according to a communication system, such as a third-generation mobile communication system (3G) or a fourth-generation mobile communication system (4G). Furthermore, the information processing device 20s may be configured to be compatible with 5G that is the next-generation mobile communication system following 4G. The BG path 24b means a process executed in the background with respect to the original process of the main body processing unit 24a.

The short-range communication I/F 21a is an interface that performs the short-range wireless communication described above or V2V or V2X wireless communication. The packet decoder 22 decodes a packet received from the short-range communication I/F 21a. The decoded packet is passed to the main body processing unit 24a. The packet classification unit 23 classifies packets decoded by the packet decoder 22, for example, on the basis of header information of the packets, and selects an SOS packet. The packet classification unit 23 passes the selected SOS packet to the main body processing unit 24a via the BG path 24b. The main body processing unit 24a transmits a packet passed from the packet decoder 22 and an SOS packet passed from the packet classification unit 23 to a base station 30 according to a communication method such as 3G or 4G.

Each of the information processing devices $20t_1$, $20t_2$, and $20t_3$ is configured to perform communication according to a communication method of short-range wireless communication, such as BLE or wireless LAN, but does not support a V2V or V2X communication. As an example, the information processing devices $20t_1$ and $20t_2$ correspond to the information processing devices 20a, 20c, 20d, and 20e of FIG. 1. Furthermore, the information processing device $20t_3$ corresponds to the information processing devices 20f and 20g.

Each of the information processing devices $20t_1$, $20t_2$ and $20t_3$ has functions similar to those of the information processing device 20s described above, except that the short-range communication I/F 21a supports V2V and V2X communication and the short-range communication I/F 21b does not support V2V and V2X communications, and therefore, detailed description thereof will be omitted.

In FIG. 2, each base station 30 is connected to a network 2, which is, for example, the Internet. In the example of FIG. 2, a regional server 40, a mobile-phone base station 41, a wired line provider 42, and a regional transport/security monitoring cloud 43 are further connected to the network 2. The regional server 40 accumulates and manages SOS packets transmitted from the information processing devices 20s, $20t_1$, $20t_2$, and $20t_3$ via the base stations 30 and the network 2 and images transmitted in response to the transmission of the SOS packets, for example, for a certain range of area.

Note that, here, in the accumulation and management, it is not always necessary to accumulate and manage raw high-volume information including all image data, as will be described later. For example, in a case where the information processing device $20t_1$ is a door phone, the information processing device $20t_1$ can be configured to accumulate and manage only necessary information for reference and temporary recording/saving using a free space of a stationary image recorder that is used for a house with the door phone, if there is no offender who is trying to harm an owner of the event notification device 10 or an event that has little risk of destruction. Furthermore, for example, in a case the information processing device $20t_1$ is a security camera provided at a predetermined building such as a store, the information processing device $20t_1$ can be configured to accumulate and manage only necessary information for reference and temporary recording/saving using a free space of a monitoring camera recorder that is installed in the store.

The regional server 40 is not limited to an independent server device and can be configured as, for example, a server on a cloud network. In addition thereto, as the regional server 40, a local dynamic map (LDM) server, which is currently being put into practical use, can be also employed. Furthermore, as a temporary storage area for the regional server 40, a free space of a stationary recorder for home use or home server can be used.

The mobile-phone base station 41 is a base station for wireless telephone communication by mobile phone terminals including smartphones. The wired line provider 42 provides a wired line that is connected to the network 2 as the Internet. Each base station 30 is connected to the network 2 via, for example, a wired line provided to the wired line provider 42. The regional transport/security monitoring cloud 43 includes a server that, for example, monitors and manages information about traffic or security for a certain range of area.

In such a configuration, it is assumed that an SOS packet transmitted from the event notification device 10 is received by, for example, the information processing devices 20s and $20t_1$ located within a predetermined distance range from the event notification device 10. In the example of FIG. 2, the information processing device 20s transmits the SOS packet received, to the base station 30 through the main body processing unit 24a, according to a communication method such as 3G or 4G. The SOS packet transmitted from the information processing device 20s is received by the base station 30 and transmitted to the regional server 40 via the network 2.

Furthermore, as in the above description, the information processing device $20t_1$ transmits the SOS packet received, to the base station 30 according to a communication method such as 3G or 4G and also broadcasts the SOS packet to the information processing device $20t_2$ located within a predetermined distance range from the information processing device t2. When receiving the SOS packet transmitted from the information processing device 20t1, the information processing device $20t_2$ transmits the received SOS packet to the base station 30 through the main body processing unit 24a, according to a communication method such as 3G or 4G.

In this way, the SOS packet transmitted from the event notification device 10 is relayed from the information processing device $20t_1$ to the information processing device $20t_2$ and transmitted to the base station 30. Furthermore, the information processing devices 20s, $20t_1$, and $20t_2$ are configured to receive the SOS packet from the event notification device 10 to shift the operation from a normal operation mode to an alert mode.

Note that assuming that, for example, the information processing device $20t_3$ is a device, such as a nomad device, that is likely to be frequently moved by the user or brought in from outside the region. In this case, the information processing device $20t_3$ can be configured not to perform processing, such as relay transmission, relating to the SOS packet, even if the information processing device $20t_3$ detects transmission of the SOS packet by the event notification device 10 in a region different from a region to which the information processing device $20t_3$ originally belongs.

Figure 3:
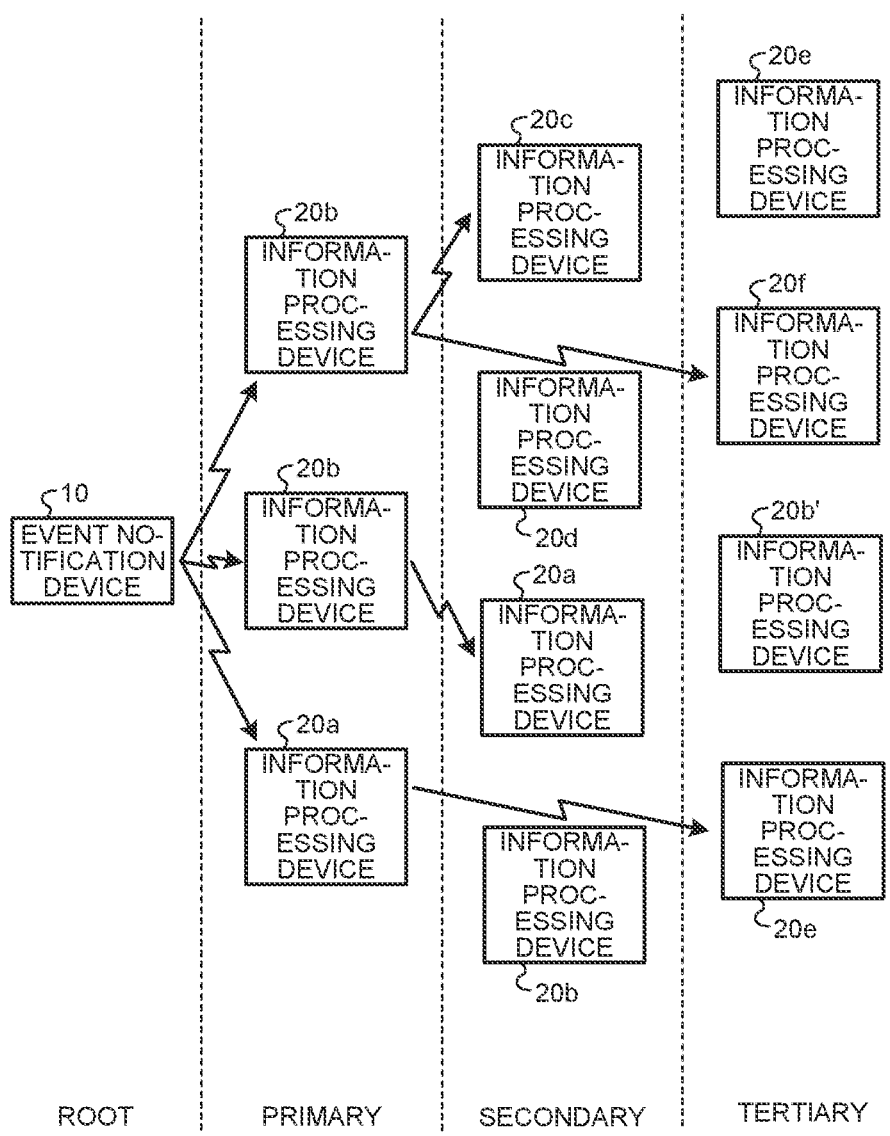
FIG. 3 is a diagram illustrating relay transmission of an SOS packet and an image according to an embodiment.

FIG. 3 is a diagram illustrating relay transmission of an SOS packet and an image according to an embodiment. The event notification device 10 that transmits the SOS packet and image first is defined as a root. The SOS packet and image transmitted from the root are directly received by one information processing device 20a and two information processing devices 20b (primary), and the SOS packet and image transmitted from one of the information processing devices 20b are received by the information processing device 20c (secondary) by relay transmission from the one information processing device 20b. Likewise, the SOS packet and image transmitted from the other of the information processing devices 20b are received by the information processing device 20a (secondary) by relay transmission from the other information processing device 20b.

Furthermore, for example, the SOS packet and image transmitted from the primary information processing device 20b are received by the information processing device 20f (tertiary) via a secondary reception (not illustrated) by relay transmission. Likewise, the SOS packet and image transmitted from the primary information processing device 20a are received by the information processing device 20e (tertiary) via a secondary reception (not illustrated) by relay transmission.

Here, an information processing device that serves as a relay point through which the SOS packets and image are relayed is called a node. In addition, the number of nodes through which the SOS packet and image are relayed and transmitted from the root is called a hop count. For example, the hop count of the SOS packet at the root is "0". Furthermore, when the information processing devices (two information processing devices 20b and one information processing device 20a) that are primary nodes transmit the SOS packet and image, the hop count is incremented by 1 and becomes "1". Furthermore, when the SOS packet and image received from a primary information processing device are transmitted to an information processing device (e.g., the information processing device 20c) that is a secondary node, the hop count is further incremented by 1 and becomes "2".

In an embodiment, an upper limit is set to the hop count for transmission of the SOS packet. As an example, assuming that the upper limit of the hop count is set to "4", a node (information processing device) that has received the SOS packet whose hop count is "4" terminates the relay transmission of the received SOS packet. On the other hand, a node that has received the SOS packet whose hop count is less than the upper limit (e.g., "2") relays and transmits the received SOS packet to a next node. In other words, it can be said that the hop count is information for instruction for transmission of an SOS packet.

Note that in the event notification device 10 and the information processing devices 20a to 20g, cyclic recording or decimation recording of a captured image (moving image) are performed for received image according to the characteristics or settings of the information processing devices 20a to 20g. The cyclic recording represents a recording method in which newer images are sequentially overwritten on older images after a predetermined time has passed after recording. Furthermore, the decimation recording is, for example, a recording method in which frames of a moving image are decimated at a predetermined cycle. The cyclic recording can record a moving image with high resolution, although a recordable time is limited. On the other hand, the decimation recording is suitable for continuous recording for a long time, but a moving image has low resolution in the time direction.

In the cyclic recording, in addition to the method simply overwriting an older image with a new image after a certain period of time, for example, it can be also considered to decimate an image after a certain period of time and store the image in another area. This method enables to record a high-resolution image for a certain time duration going back from the present, and an image before that can be retained with a low resolution. Use of an image recorded with high resolution makes it possible to readily extract feature information effective for tracking determination for such as person identification from face detection or clothing image analysis. Furthermore, it can be also considered to cut out an image within a range of feature information extraction, and compress and store the image.

In particular, recorded information recorded by secondary and subsequent nodes does not always have important information. Therefore, a feature of a detection target or information (image or the like) containing details of the feature may be preferentially stored with high precision, paying attention to a vehicle or a person included in information (difference information) about a difference from the normal time. This might improve image retrieval performance as well.

For example, it can be considered to select an image with higher sharpness from among moving image frames, as information to be stored. Furthermore, it can be also considered to select, as the information to be stored, a moving image frame showing the front side of a target (facing a camera), such as a person or vehicle, facilitating capturing a feature of the face or clothes of the person recognized, a feature of the vehicle recognized, or the like. Furthermore, not only a single frame but also a plurality of frames, for example, frames before and after the timing of occurrence of an event can be selected as the information to be stored. Which method is used to store information is determined, for example, in consideration of the processing capacity in image recognition of a device and the load power consumption of the device.

Here, for example, consider a situation where the event notification device 10 is a security notification device and the event notification device 10 transmits an SOS packet. In this situation, an offender who intends to harm an owner of the event notification device 10 may be in the vicinity of the owner. In this case, one of the first nodes to which the SOS packet transmitted from the event notification device 10 is relayed and transmitted may be a nomad device held by the offender on the spot. There may be a possibility that the SOS packet received by the nomad device may be destroyed by the offender.

In other words, these SOS packets are usually required to promptly and automatically transfer a relief request. Therefore, the transmission of the SOS packet is transmitted through background processing of a device, and is promptly transmitted to the next receivable device unless there is intentional intervention by the user. On the other hand, as described above, there may be a possibility that a malicious user, such as the offender, may destroy the SOS packet received by the nomad device. A function of monitoring whether the background processing and transmission processing of the function in a mobile terminal device, such as a smartphone, is effective or whether the background processing of the function is intentionally interrupted by the user can be used in combination with the SOS packet transmission function. This makes it possible to narrow down to the nomad device that may be held by the offender.

As described above, in the information processing system according to an embodiment, the SOS packet and image transmitted from the event notification device 10 are transmitted via a plurality of routes. Therefore, even if one of the first nodes to which the SOS packet and image are relayed and transmitted is the nomad device of the offender and the SOS packet and image received by the nomad device are destroyed, the SOS packet and image are likely to be transmitted to another node, avoiding the loss of the SOS packet and image.

Here, consider the background processing function intentionally stopped by the offender to avoid relay transmission of the SOS packet by the nomad device held by the offender. In this case, the nomad device can be marked up according to a change in the status of the function. When the offender who assumes that an unspecified number of receiving devices around him/her are in an alert mode at the same time escapes, the offender escapes while avoiding the peripheral monitoring devices, and thereby, a characteristic action caused by impatience or the like, such as an action taken by the offender who worries about the surroundings, is likely to be shown.

Furthermore, in a case where the event notification device 10 has an imaging function, an image captured by using the imaging function is transmitted after an SOS packet is transmitted, as described above. For example, in the case where the event notification device 10 is the security notification device, as described above, it can be considered that when the holder operates the event notification device 10 to transmit an SOS packet, the offender may destroy the event notification device 10. Therefore, the event notification device 10 according to an embodiment transmits the SOS packet having a smaller data size than the image, before sending the image. Thus, even if the event notification device 10 is destroyed by the offender, the possibility that the transmission of the SOS packet has been completed becomes higher.

Exemplary Hardware Configurations Applicable to Embodiment

Figure 4:
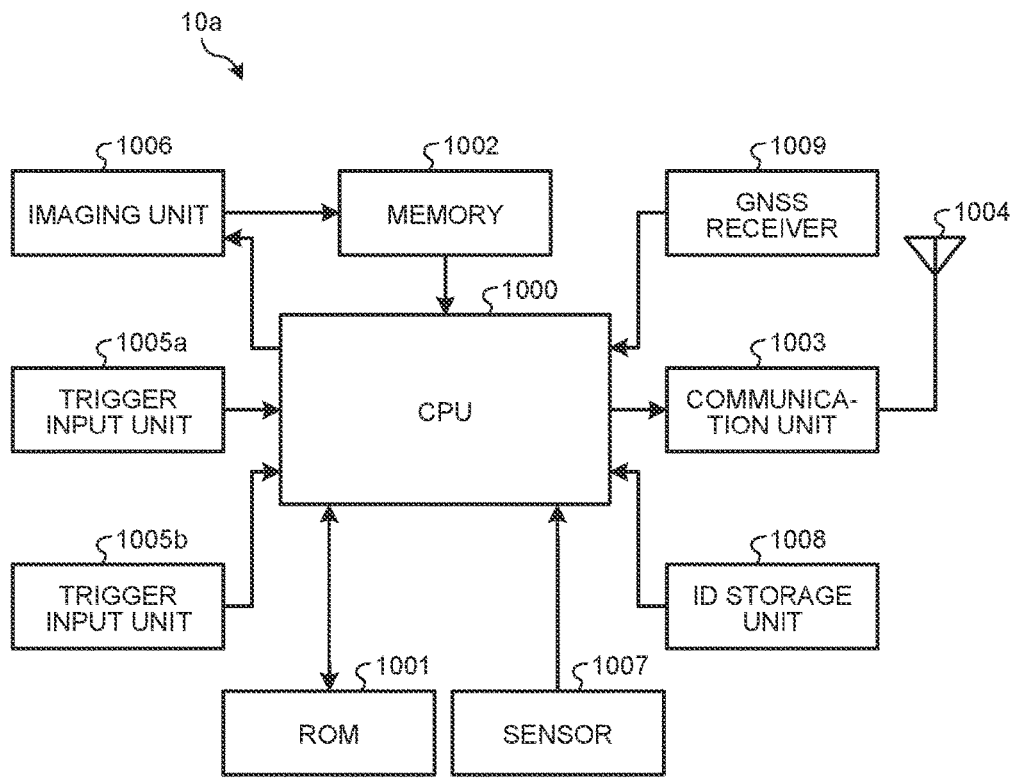
FIG. 4 is a block diagram illustrating an exemplary hardware configuration of an example of an event notification device as a security notification device, applicable to an embodiment.

Next, an exemplary hardware configuration applicable to an embodiment will be described. FIG. 4 is a block diagram illustrating an exemplary hardware configuration of an example of an event notification device 10a as a security notification device, applicable to an embodiment. In FIG. 4, the event notification device 10a includes a central processing unit (CPU) 1000, a read only memory (ROM) 1001, a memory 1002, a communication unit 1003, an antenna 1004, trigger input units 1005a and 1005b, an imaging unit 1006, a sensor 1007, an ID storage unit 1008, and a GNSS receiver 1009.

The CPU 1000 controls the overall operation of the event notification device 10 by using, for example, the memory 1002 that is a random access memory (RAM) as a work memory, according to an information processing program stored in the ROM 1001 in advance. The communication unit 1003 modulates information output from the CPU 1000 and transmits the information from the antenna 1004. The communication unit 1003 is configured to transmit the information by broadcasting via BLE or wireless LAN. In addition, the communication unit 1003 is also configured to perform communication by specifying a destination address.

Each of the trigger input units 1005a and 1005b receives an input of a trigger for transmission of an SOS packet by the event notification device 10. In this example, the event notification device 10 receives inputs of triggers by two types of input methods. As an example, the trigger input unit 1005a includes a button, and the operation with respect to the button triggers the transmission of the SOS packet. Furthermore, for example, the trigger input unit 1005b includes a switch that operates by pulling a string, and the action of pulling the string triggers the transmission of the SOS packet.

The imaging unit 1006 captures a moving image under the control of the CPU 1000. The moving image captured by the imaging unit 1006 is stored in the memory 1002. The sensor 1007 can employ an accelerometer that detects acceleration applied to a casing of the event notification device 10. The detection of acceleration equal to or above a predetermined value by the sensor 1007 triggers the transmission of the SOS packet. For example, if the event notification device 10 is destroyed, it can be considered that an acceleration equal to or above the predetermined value is applied to the sensor 1007.

The ID storage unit 1008 non-volatilely stores an ID for identifying an event, generated by the CPU 1000. Each time each of the trigger input units 1005a and 1005b and the sensor 1007 detects a trigger for transmitting an SOS packet, the CPU 1000 generates a unique ID for identifying the trigger as an event. As a method of generating an ID, for example, a method of generating a character string or numerical sequence of a predetermined number of digits, on the basis of a pseudo-random number can be considered. In addition thereto, an ID may be generated on the basis of the time and position where the trigger is detected. Furthermore, an ID may be generated by adding a serial number or the like to the production serial number of the event notification device 10a. In this case, the ID may contain information that can identify an individual, and thus the ID needs to be handled carefully. When a new ID is generated, the ID storage unit 1008 overwrites an ID having been previously generated and already stored in the ID storage unit 1008 with the generated new ID.

The GNSS receiver 1009 receives a signal from a global positioning system (GPS) and acquires position information indicating the current position of the event notification device 10. The position information is indicated by, for example, latitude and longitude information.

Note that the event notification device 10a can be configured to receive the connection of a sound collection device such as a microphone to acquire sound. Sound information and an image or the like can be treated equally. The event notification device 10a can also be configured to receive an input of a trigger on the basis of sound collected by the sound collection device.

As described above, an example of in the case of transmitting an SOS packet from the event notification device 10 has been described, but the input of a trigger is not limited to this example. For example, the event notification device 10 may receive stepwise inputs of triggers and transmit information hierarchically. For example, the event notification device 10 can receive two step input of triggers, that is, an input of a trigger of the first step to issue a minor alert without transmission of an SOS packet, and an input of a trigger of the second step to transmit the SOS packet for a relief request.

As an example, when the user who holds the event notification device 10 feels that walking on an off street at night requires caution although he/she is not in danger at the moment, the user issues a minor alert by an input of a trigger of the first step. Furthermore, the user transmits an SOS packet as the relief request by an input of the trigger of the second step, when actually feeling danger. As described above, information (alert issuance, SOS packet) is transmitted stepwise by inputting triggers stepwise, and thus, a deterrence against a dangerous act can be expected for effective security.

Figure 5:
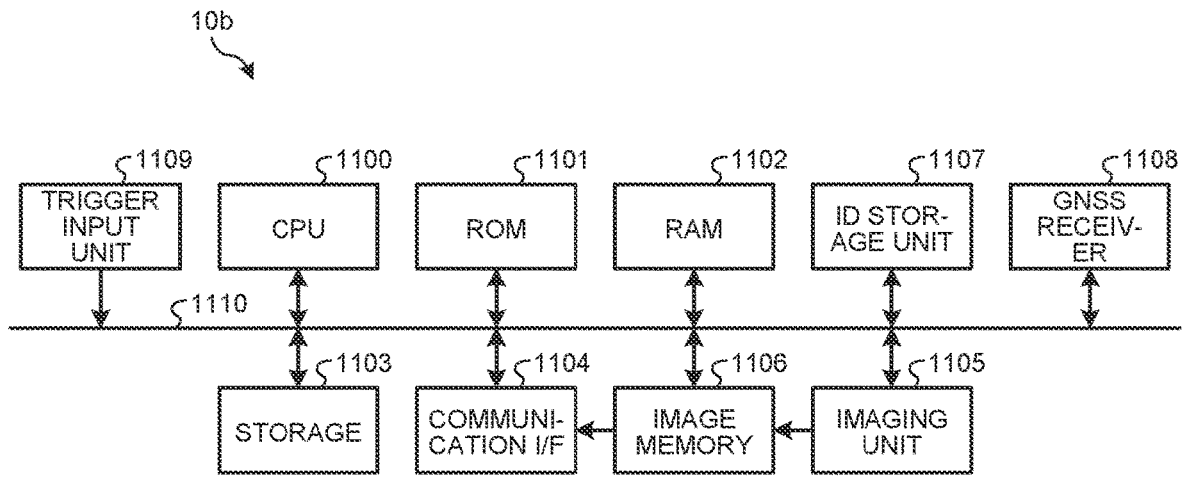
FIG. 5 is a block diagram illustrating an exemplary hardware configuration of an example of an event notification device as an in-vehicle device, applicable to an embodiment.

FIG. 5 is a block diagram illustrating an exemplary hardware configuration of an example of an event notification device 10b as an in-vehicle device, applicable to an embodiment. In FIG. 5, the event notification device 10b includes a CPU 1100, a ROM 1101, a RAM 1102, a storage 1103, a communication I/F 1104, an imaging unit 1105, an image memory 1106, an ID storage unit, an ID storage unit 1107, a GNSS receiver 1108, and a trigger input unit 1109, which are connected to a bus 1110.

The storage 1103 is a non-volatile storage medium, such as a hard disk drive or flash memory. The CPU 1100 controls the overall operation of the event notification device 10b according to an information processing program stored in advance in the ROM 1101 and the storage 1103.

The communication I/F 1104 is a communication interface for communicating with an external device. For example, the communication I/F 1104 is configured to perform wireless communication by at least one of BLE, wireless LAN, V2V, and V2X communication. The communication I/F 1104 can also function as an interface to a control system of a vehicle on which the event notification device 10b is mounted.

The imaging unit 1105 captures a moving image under the control of the CPU 1100. The moving image captured by the imaging unit 1105 is temporarily stored in the image memory 1106. The moving image stored in the image memory 1106 is transmitted to the outside by the communication I/F 1104 in response to an instruction from the CPU 1100. Furthermore, a moving image stored in the image memory 1106 may be stored in the storage 1103.

The ID storage unit 1107 stores an ID for identifying an event generated by the CPU 1100, as in the ID storage unit 1008 described above. When a new ID is generated, the ID storage unit 1107 overwrites an ID having been previously generated and already stored in the ID storage unit 1107 with the generated new ID.

The GNSS receiver 1108 receives a GNSS signal and acquires position information indicating the current position of the event notification device 10b.

The event notification device 10b can be configured to receive the connection of a sound collection device such as a microphone to acquire sound. Sound information and an image or the like can be treated equally.

The trigger input unit 1109 receives an input of a trigger for transmission of an SOS packet by the event notification device 10b. For example, the event notification device 10b includes one or more operation units for user's operation, and the trigger input unit 1109 is configured to receive operation of this operation unit by the user, as an input of a trigger. As the operation unit for an input of a trigger, a button responding to pressing, a switch operated by a lever, or the like can be employed. In addition thereto, a touch panel that reacts to contact with a finger or the like may be employed as the operation unit. Furthermore, a plurality of operation units including different types of operation units can be provided to have different types of triggers to be input.

Furthermore, the event notification device 10b is configured to acquire, for example, information about an impact or the like applied to the vehicle or information about an approaching vehicle, obtained by analyzing an image captured by an imaging device provided at the vehicle, from a vehicle on which the event notification device 10b is mounted, via the communication I/F 1104. The trigger input unit 1109 is configured to receive each piece of information acquired from the vehicle in this way, as an input of a trigger.

Furthermore, in the event notification device 10b, the trigger input unit 1109 recognizes a gesture of an occupant including a driver on the basis of an image captured by an imaging device for imaging the inside of the vehicle, and considers a predetermined gesture recognized as an input of a trigger. Furthermore, the trigger input unit 1109 may consider detection of voice including pronunciation of a specific word from sound collected by a sound collection device, as an input of a trigger.

When the event notification device 10 is employed as an in-vehicle device, the event notification device 10 is applicable to various cases, for reporting and issuing information related to an event caused by the vehicle itself during driving. For example, an input of a trigger in response to an intentional operation by the driver due to poor health of the driver or an input of a trigger by automatically detecting the poor health by a driver's state detection device of an autopilot system, such as a driver monitoring system can be assumed. Furthermore, for example, an input of a trigger in response to detection of a delay of driver's response in a restoration sequence to a restoration request for restoration of a manual drive from automatic driving, given by the system or an input of a trigger in response to detection of emergency stop instruction information given to the vehicle by a third party other than the vehicle can be assumed.

Furthermore, an input of a trigger for manually notifying a roadside service office or an LDM server of an obstacle on a road that a driver has encountered during driving can be assumed. Furthermore, when an in-board autonomous environment recognition device autonomously detects an obstacle on a road during driving, an input of a trigger for automatically transmitting the presence of determination difficult information promptly, on the basis of a result of determination indicating whether the obstacle on the road has unrecognized/unidentified information or an unidentifiable object can be assumed. Therefore, it becomes possible to promptly provide risk information about a location indicated by the notification, for example, to the LDM server.

Therefore, it is possible to relay and transmit the risk information in advance, by the LDM server or V2V communication to a vehicle behind that approaches the location, before the vehicle approaches the location. Thus, the vehicle behind or the like can be promptly notified of the latest risk information about road infrastructure used by vehicles in common by relay transmission, and the road infrastructure can be used more safely.

Unlike crime prevention usage, in such usage where update of registered information of the LDM server and notification to a vehicle behind that are performed by the event notification device 10 are important, a transmission destination target is not merely expansion/dispersion from a location but a vehicle that approaches the location, or the LDM server. Therefore, vector information indicating a transmission direction may be further added to information to be relayed and transmitted.

Figure 6:
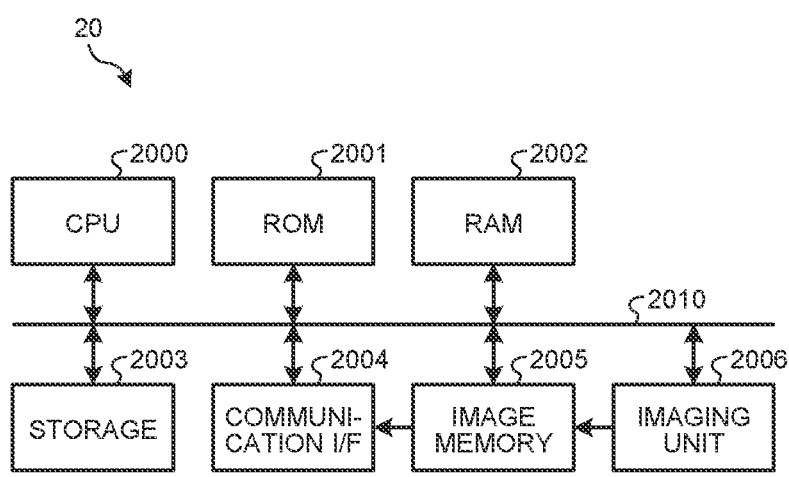
FIG. 6 is a block diagram illustrating a typical exemplary hardware configuration of an information processing device applicable to an embodiment.

FIG. 6 is a block diagram illustrating a typical exemplary hardware configuration of each of the information processing devices 20a to 20g applicable to an embodiment. In the following description, unless otherwise specified, the information processing devices 20a to 20g are collectively referred to as an information processing device 20.

In FIG. 6, the information processing device 20 includes a CPU 2000, a ROM 2001, a RAM 2002, a storage 2003, a communication I/F 2004, an image memory 2005, and an imaging unit 2006, which are connected to a bus 2010. The information processing device 20 may further include a GNSS receiver that receives a GNSS signal and acquires position information indicating the current position of the device.

The storage 2003 is a non-volatile storage medium, such as a hard disk drive or flash memory. The CPU 2000 controls the overall processing of the information processing device 20 by using the RAM 2002 as a work memory according to an information processing program stored in advance in the storage 2003 and the ROM 2001.

The imaging unit 2006 captures a moving image under the control of the CPU 2000. The moving image captured by the imaging unit 2006 is temporarily stored in the image memory 2005. The moving image stored in the image memory 2005 is transmitted to the outside by the communication I/F 2004 according to the instruction from the CPU 2000. Furthermore, a moving image stored in the image memory 2005 may be stored in the storage 2003.

Note that the information processing device 20 can be configured to receive the connection of a microphone to acquire sound. Sound information and an image or the like can be treated equally.

Details of Processing According to Embodiment

Figure 7:
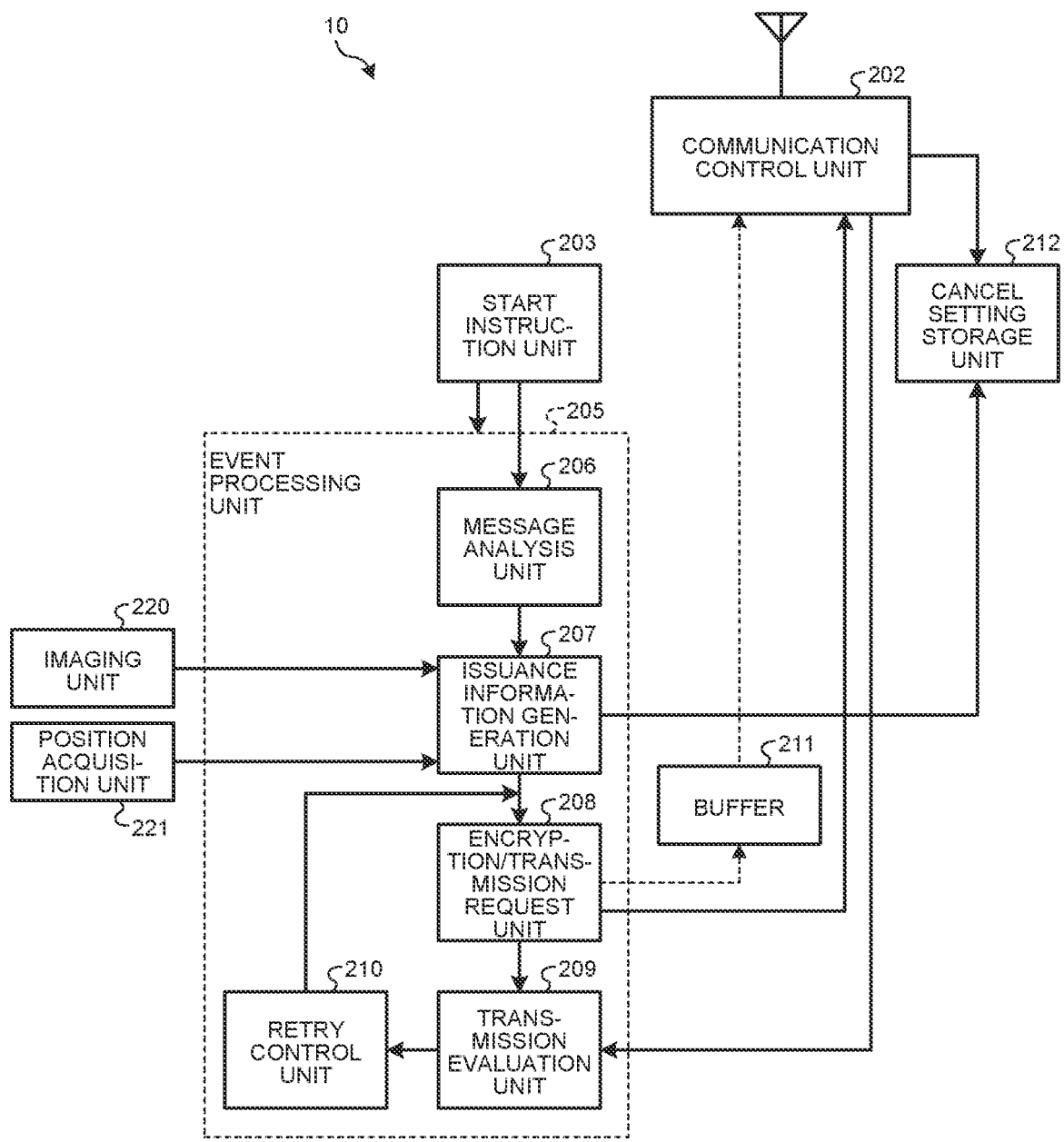
FIG. 7 is a functional block diagram illustrating an example of the function of an event notification device according to an embodiment.

FIG. 7 is a functional block diagram illustrating an example of the function of the event notification device 10 according to an embodiment. Note that the functional block diagram of FIG. 7 is applicable in common to the event notification devices 10a and 10b described above.

In FIG. 7, the event notification device 10 includes a communication control unit 202, a start instruction unit 203, an event processing unit 205, a buffer 211, a cancel setting storage unit 212, an imaging unit 220, and a position acquisition unit 221. Furthermore, the event processing unit 205 includes a message analysis unit 206, an issuance information generation unit 207, an encryption/transmission request unit 208, a transmission evaluation unit 209, and a retry control unit 210.

The communication control unit 202, the start instruction unit 203, the event processing unit 205, the buffer 211, the cancel setting storage unit 212, the imaging unit 220, and the position acquisition unit 221 are achieved by a program running on the CPU 1000. Furthermore, among these, the functions unique to the embodiment are achieved by the start instruction unit 203 and the event processing unit 205.

The communication control unit 202 controls wireless communication to the outside by the event notification device 10. The event notification device 10 assumes a security notification device (event notification device 10a) or an in-vehicle device (event notification device 10b) and does not assume wired communication as communication to the outside in these cases. Wired communication generally does not assume direct connection to the vicinity of a transmission source, and transmitted information is once transmitted to a router of a network provider. In order to transmit information to the vicinity of the source, it is necessary to transmit the information from the router of the network provider to, for example, a remote server, and then sort the information again and transmit the information to a region near the transmission source, and thus, there is a possibility of high cost, and the relay transmission using the wireless communication according to the embodiment is disadvantageous, in this point.

The start instruction unit 203 starts processing by the event processing unit 205 according to an event detected by the trigger input units 1005a and 1005b and the sensor 107 in FIG. 4, and the trigger input unit 1109 in FIG. 5, and transmits information indicating the event to the event processing unit 205.

As the types of events according to an embodiment, for example, the following (1) to (4) can be considered.
  (1) An event by an alert switch
  (2) An event by an emergency assistance request switch
  (3) An event by an impact detection accelerometer
  (4) Events by an alert release switch, multi-stage release switch, and dummy status request switch In the above events, the alert switch of (1) corresponds to, for example, the trigger input unit 1005a of the event notification device 10a, and the event by the alert switch is regarded as an event having a relatively low degree of urgency (degree of importance). In this event, it can be considered that an SOS packet is transmitted, the imaging unit 220 starts imaging, and a captured image is transmitted with a data capacity reduced by, for example, decimation.

The emergency assistance request switch of (2) corresponds to, for example, the trigger input unit 1005b of the event notification device 10a, and the event by the emergency assistance request switch is regarded as an event having a higher degree of urgency than the event by the alert switch. In this event, an SOS packet is transmitted, and after the transmission of the SOS packet, a detailed image or decimated image is transmitted.

The event by the impact detection accelerometer of (3) can employ, for example, an event in response to detection of an acceleration when a predetermined value or more is detected by the sensor 1007 of the event notification device 10a. This event is regarded as an event having the highest degree of urgency, and an SOS packet is automatically transmitted regardless of the intention of a user holding the event notification device 10a. Furthermore, after the transmission of the SOS packet, an image is transmitted, if possible.

Of the events by the alert release switch, the multi-stage release switch, and the dummy status request switch of (4), the event by the alert release switch is, for example, an event that issues information to cancel an event by the SOS packet already transmitted. Furthermore, the event by the multi-stage release switch is, for example, an event that issues information to lower the degree of urgency of an event by the SOS packet already transmitted. Furthermore, the event by the dummy status request switch is, for example, an event for the user holding the event notification device 10a to issue his/her own position or the like.

Note that the events (1) to (4) described above can be defined similarly for the event notification device 10b as an in-vehicle device. As described above, the event notification device 10b as an in-vehicle device is configured to be compatible with a wide variety of inputs of triggers, and thus it is also possible to define more events. As examples of this event, in addition to the events of (1) to (4) described above, (5) notification of abnormality such as a fallen object on the road, fallen rock, depression, fallen tree specified by a driver, and (6) notification of witness of tailgating, an incident, or dangerous action or wrong-way vehicle purpose notification, and (7) automatic detection and notification of an event that it difficult for the on-board advanced driver assistance system (ADAS) device to determine a road driving condition, or the like can be considered. The events can be classified according to, for example, the types of triggers received by the trigger input unit 1109 of the event notification device 10b.

In the event processing unit 205, the message analysis unit 206 analyzes the event on the basis of information passed from the start instruction unit 203 and identifies which event of (1) to (7) described above has occurred.

The issuance information generation unit 207 generates an SOS packet on the basis of the event analyzed by the message analysis unit 206. More specifically, the issuance information generation unit 207 determines the level of the analyzed event, according to one of the events of (1) to (7) described above to which the analyzed event corresponds. For example, the issuance information generation unit 207 determines that the higher the degree of urgency of an event, the higher the level (level "3") and determines that the lower the degree of urgency of an event, the lower the level (level "1").

Furthermore, the issuance information generation unit 207 generates an ID unique to this event, as described above. Furthermore, the issuance information generation unit 207 acquires time information indicating the time when the event has been detected and also acquires position information indicating a position and acquired by the position acquisition unit 221. Still furthermore, the issuance information generation unit 207 sets a hop count of the SOS packet based on this event. In each of the event notification devices 10a and 10b, the hop count is set to "0" because each of the event notification devices 10a and 10b is the first transmission source of the SOS packet relating to the event. Furthermore, the issuance information generation unit 207 generates type information indicating the type of a device (e.g., the event notification device 10a) that has generated the event.

Note that the event notification device 10a cannot detect its own position when receiving a trigger, in some cases. In that case, the event notification device 10a is configured to add, as tagged information such as a final detection position, the last position detected upon receiving the trigger to the ID. For example, when a received GNSS satellite signal does not have a desired accuracy, the event notification device 10a once transmits the SOS packet without waiting for improvement of the quality or accuracy of a radio wave received. Thereafter, when it is determined that more highly accurate information is acquired, the event notification device 10a may add the acquired information to the same ID and transmit the SOS packet again.

FIG. 8A is a diagram illustrating a configuration example of an SOS packet according to an embodiment. For example, the SOS packet stores packet type information indicating that the packet is an SOS packet at the head (header information). The SOS packet further stores level, hop count, ID, type, position information, and time information thereof. The position information and the time information of the information are left blank if they cannot be acquired.

Although a detailed description will be made later, each time the SOS packet reaches a node by relay transmission, the type, position information, and time information of the information stored in the SOS packet are added to the SOS packet by the node. FIG. 8B is a diagram illustrating an example of the SOS packet to which the type, position information, and the time information are added. Note that in the SOS packet, the packet type, level, and ID do not change even through relay transmission. The hop count is incremented by 1 each time the SOS packet reaches a node. In this way, the type, position information, and time information are added to the SOS packet at each node that the SOS packet reaches, and thus, situation around a position where an event occurs or a range that an event affects can be easily estimated.

Furthermore, the issuance information generation unit 207 acquires a captured image from the imaging unit 220.

The encryption/transmission request unit 208 requests the communication control unit 202 to transmit an SOS packet generated by the issuance information generation unit 207. At this time, the encryption/transmission request unit 208 requests the communication control unit 202 to give top priority to the transmission of the SOS packet. An example of such communication control includes priority control based on quality of service (QoS) guarantee in voice over long term evolution (VOLTE). Furthermore, the encryption/transmission request unit 208 requests the communication control unit 202 to transmit an image acquired by the issuance information generation unit 207. Furthermore, the encryption/transmission request unit 208 requests the communication control unit 202 to transmit the image after transmitting the SOS packet. Furthermore, the encryption/transmission request unit 208 stores the image for transmission in the buffer 211.

Here, the encryption/transmission request unit 208 determines whether to encrypt the image for transmission, on the basis of level information stored in the SOS packet. For example, the encryption/transmission request unit 208 encrypts and transmits the image when the level stored in the SOS packet is lower (e.g., level "1" or "2"). Furthermore, when the level stored in the SOS packet is higher (e.g., level "3"), the encryption/transmission request unit 208 transmits the image without encryption. This is processing according to the protection of privacy and degree of urgency. The image may contain a lot of pieces of personal information about the user and others and is basically transmitted after encryption. On the other hand, when the level of the SOS packet is higher and the degree of urgency is higher, the image is transmitted without encryption, for facilitating viewing.

Note that the encryption/transmission request unit 208 stores information indicating an upper limit value of a hop count in advance, and requests the communication control unit 202 to transmit an SOS packet and an image when a hop count stored in the SOS packet is less than the upper limit value. This makes it possible to prevent unlimited propagation of the SOS packet. Note that the upper limit value of the hop count is preferably set to an appropriate value according to a condition such as the size of an assumed region. For example, it is considered that when the assumed region is a densely populated area, a larger upper limit is set and when the assumed region is a sparsely populated area, a smaller upper limit is set. Furthermore, for example, it can be considered to set the upper limit value according to the area of the assumed region.

The transmission evaluation unit 209 determines whether transmission of an SOS packet and an image performed in response to a request from the encryption/transmission request unit 208 is successful, on the basis of information acquired from the communication control unit 202. When the transmission evaluation unit 209 determines that transmission of the image has failed, the retry control unit 210 requests the encryption/transmission request unit 208 to retransmit the image. In response to this request, the encryption/transmission request unit 208 requests the communication control unit 202 to transmit the image stored in the buffer 211.

When the event notification device 10 is set to prohibit an SOS packet transmission function, the cancel setting storage unit 212 invisibly stores an SOS packet generated by the issuance information generation unit 207, for example, in the memory 1002 (in the case of the event notification device 10a)) or in the storage 1103 or the RAM 1102 (in the case of the event notification device 10b). Furthermore, an image acquired from the issuance information generation unit 207 may be stored invisibly. This is a setting when, for example, priority is given to prevention of destruction of the SOS packet by the offender and the privacy protection from any access. Note that the SOS packet can be invisibly stored by setting the SOS packet to restrict access by the user, and the SOS packet invisibly stored can be accessed from the communication control unit 202.

An information processing program for achieving each function according to an embodiment in the event notification device 10 is provided by being recorded in a computer-readable recording medium, such as a compact disk (CD), a flexible disk (FD), or a digital versatile disk (DVD), in an installable or executable file format. In addition thereto, the program may be provided by being stored on a computer connected to a network such as the Internet and by being downloaded via the network. Furthermore, the program may be configured to be provided or distributed via the network such as the Internet.

The information processing program has a modular configuration including the start instruction unit 203, the message analysis unit 206, the issuance information generation unit 207, the encryption/transmission request unit 208, the transmission evaluation unit 209, and the retry control unit 210. As actual hardware, for example, the event notification device 10a is configured so that the CPU 1000 reads the information processing program from a storage medium such as ROM 1001 and executes the program, each of the units described above is loaded on a main storage device, such as the memory 1002, and the start instruction unit 203, the message analysis unit 206, the issuance information generation unit 207, the encryption/transmission request unit 208, the transmission evaluation unit 209, and the retry control unit 210 are generated on the main storage device.

Figure 9:
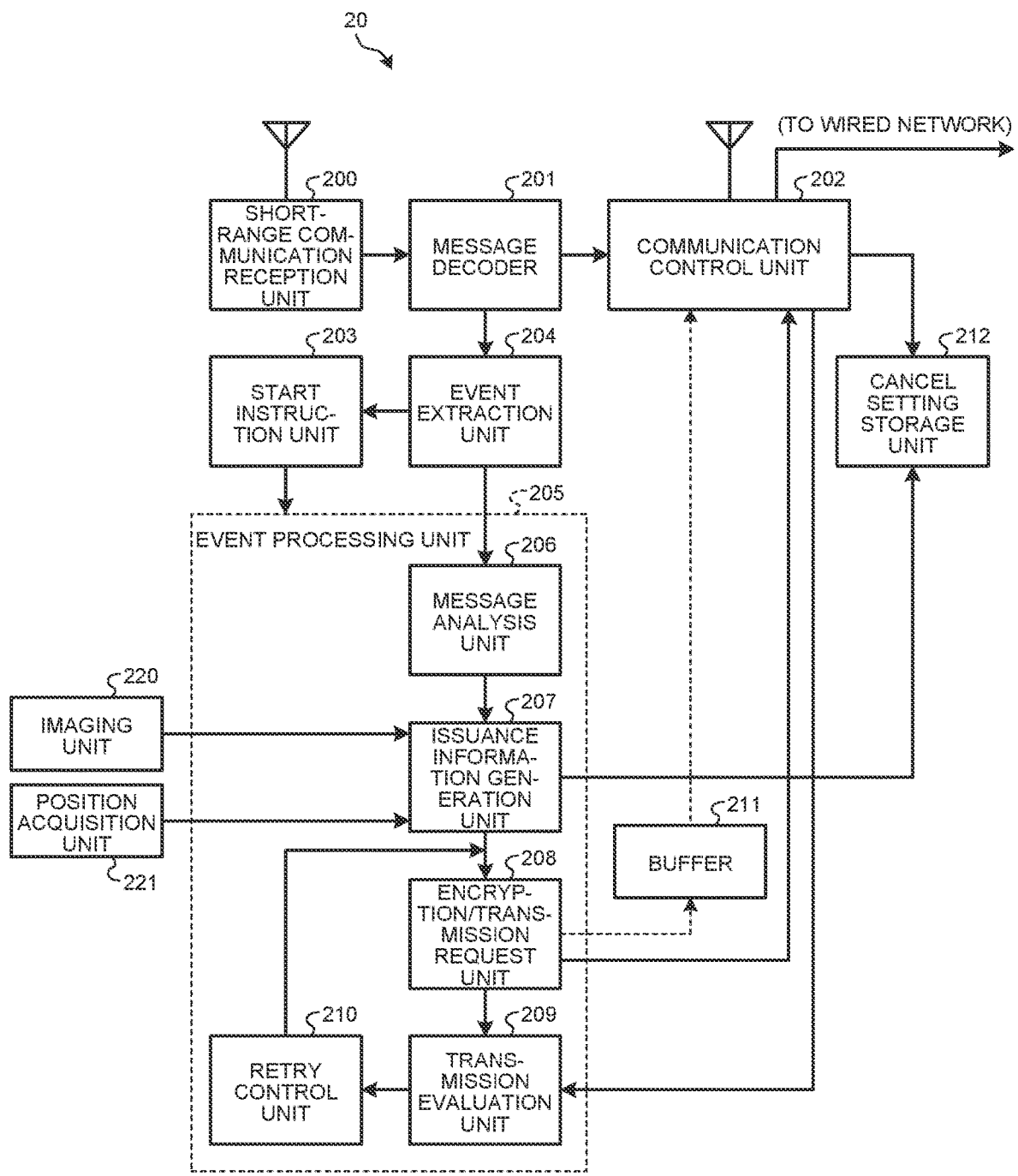
FIG. 9 is a functional block diagram illustrating an example of the function of an information processing device according to an embodiment.

FIG. 9 is a functional block diagram illustrating an example of the function of the information processing device 20 according to an embodiment. In the configuration illustrated in FIG. 9, a short-range communication reception unit 200, a message decoder 201, and an event extraction unit 204 are added to the configuration described with reference to FIG. 7.

The short-range communication reception unit 200 receives information transmitted by short-range wireless communication. For example, the short-range communication reception unit 200 receives information transmitted by a short-range communication method, such as the above-mentioned wireless LAN or BLE, or V2V or V2X communication. The message decoder 201 decodes information received by the short-range communication reception unit 200. The message decoder 201 passes the decoded information to the communication control unit 202 and the event extraction unit 204. In the example of FIG. 9, the communication control unit 202 is configured to perform wired communication in addition to wireless communication.

The event extraction unit 204 determines whether information passed from the message decoder 201 is an SOS packet, and when the information is determined as the SOS packet, the event extraction unit 204 passes the SOS packet to the message analysis unit 206 and the start instruction unit 203. When the SOS packet is passed from the event extraction unit 204, the start instruction unit 203 starts processing by the event processing unit 205.

Furthermore, when information passed from the message decoder 201 is an image corresponding to the SOS packet, the event extraction unit 204 passes the image to the message analysis unit 206. The message analysis unit 206 transmits the image received to the issuance information generation unit 207.

The message analysis unit 206 analyzes an event on the basis of the SOS packet passed from the event extraction unit 204. Since the subsequent processing is the same as the content illustrated in FIG. 7, a detailed description will be omitted here.

In the information processing device 20, the issuance information generation unit 207 generates type, position information, and time information and adds the generated information to a received SOS packet (see FIG. 8B). Furthermore, the issuance information generation unit 207 rewrites the value of a hop count stored in the SOS packet by incrementing the hop count by 1. Furthermore, in the information processing device 20, the issuance information generation unit 207 generates no ID.

Furthermore, in a case where the information processing device 20 is, for example, the information processing device 20f being a nomad device, there is a possibility that a user who holds the information processing device 20f may be an offender to a user who holds the event notification device 10a that has transmitted an SOS packet. In this case, it can be considered that the information processing device 20f is likely to be set by the user who is the offender so as to prohibit the SOS packet transmission function, for example, in the name of protecting personal information. In such a case, the invisible storage of the SOS packet or image prevents the SOS packet or image from being destroyed by the offender.

When the user holding the information processing device 20f is the offender, the SOS packet transmitted from, for example, the event notification device 10a held by the user who is the victim to the offender is likely to be received by the information processing device 20f held by the offender, with the information processing device 20f as a primary relay transmission destination. Therefore, these SOS packet and image which are stored invisibly are information closest to the offender in the event, and the processing has higher priority. Thus, it can be said that invisible storage of these SOS packet and image is useful.

Figure 10:
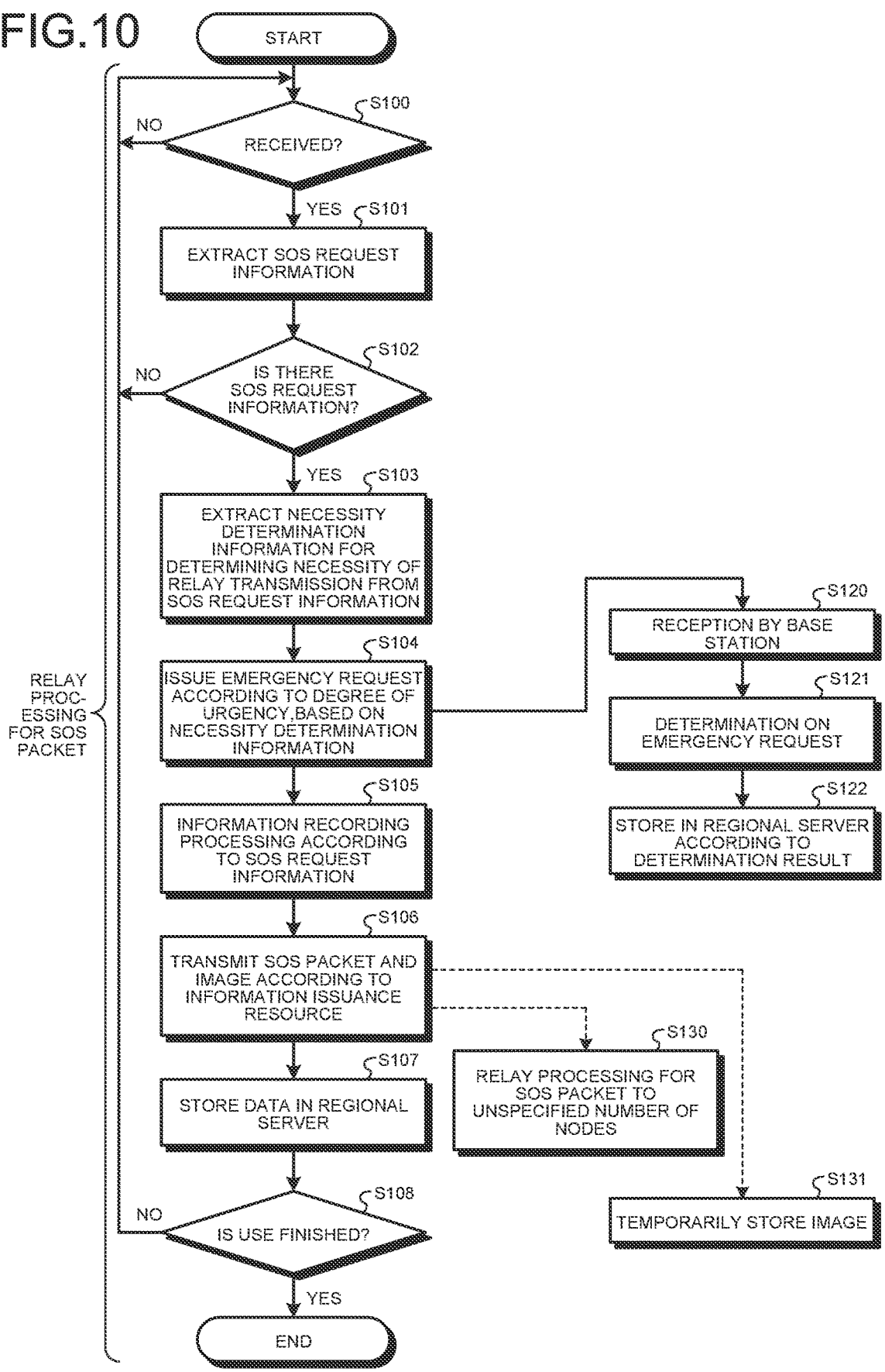
FIG. 10 is a flowchart illustrating an example of a process in an information processing device according to an embodiment.

FIG. 10 is a flowchart illustrating an example of a process in an information processing device 20 according to an embodiment. Here, the process illustrated in the flowchart of FIG. 10 shows an example of a process performed by a nomad device, that is, the information processing device 20f, such as a smartphone or tablet computer, that is assumed to perform wireless communication.

In Step S100, the event extraction unit 204 determines whether information is received by the short-range communication reception unit 200, for example, on the basis of information from the message decoder 201. If it is determined that no information is received (Step S100, "No"), the process is returned to Step S100, and if it is determined that the information is received (Step S100, "Yes"), the process proceeds to Step S101.

Here, in a general short-range communication device, when a communication partner is a device having been registered in the general short-range communication device, communication is started from, for example, a pairing process, and a reception preparation processing for a body message is performed. On the other hand, in the embodiment, when receiving information, such as an SOS packet, transmitted from any or unspecified partner, the information is received without performing the pairing processing.

In Step S101, the event extraction unit 204 receives the received information from the message decoder 201, and attempts to extract an SOS request from the received information. In the next Step S102, the event extraction unit 204 determines whether the received information includes the SOS request. In other words, when a packet type included in the received information indicates an SOS packet, the event extraction unit 204 determines that this information (SOS packet) is an SOS packet and includes an SOS request. If the event extraction unit 204 determines that the received information includes no SOS request (Step S102, "No"), the process returns to Step S100.

On the other hand, if the event extraction unit 204 determines that the received information includes the SOS request (Step S102, "Yes"), the event extraction unit 204 passes the SOS packet to the message analysis unit 206, and the process proceeds to Step S103. The message analysis unit 206 analyzes the received SOS packet and acquires SOS request information contained in the SOS packet. In Step S103, the issuance information generation unit 207 extracts necessity determination information for determining the necessity of relay transmission of the SOS packet from the SOS request information.

The necessity determination information will be described. The issuance information generation unit 207 generates the necessity determination information on the basis of, for example, level or position information contained in the SOS packet. For example, the issuance information generation unit 207 determines that the higher the level, the higher the necessity for relay transmission. Furthermore, the issuance information generation unit 207 obtains an information attenuation rate on the basis of at least one of position information and time information. For example, the attenuation rate can be obtained according to a distance between the latest position information and the position information, the position information being acquired upon transmitting the SOS packet from the event notification device 10. In this case, it is considered that the farther the distance, the lower the relevance between the two pieces of position information, and the attenuation rate is set to be higher.

In the next Step S104, the encryption/transmission request unit 208 requests the communication control unit 202 to issue an emergency request for an emergency dispatch according to the degree of urgency, on the basis of the necessity determination information obtained in Step S103.

In other words, when a mobile terminal such as a smartphone becomes an SOS packet reception node, the reception node has both of a short-range wireless communication function and a communication capability for public telephone line that is capable of communication with a distant place. Therefore, when the received SOS packet contains emergency request information, an emergency request issuance signal for emergency call 110 for police or 119 for ambulance can be transmitted to the mobile-phone base station 41 according to the information. For example, when the level contained in the SOS packet shows the highest value, it can be determined that the SOS packet has the highest degree of urgency.

The communication control unit 202 transmits, to the mobile-phone base station 41, an emergency request issued to an emergency call destination that is defined in each country, such as emergency call 110 or 119, in Japan, by wireless telephone communication, for example. Here, it is assumed that the issued emergency request to be transmitted includes the contents of the SOS packet. When an image and sound that are captured and collected by the information processing device 20 are received before and after receiving the SOS packet, it is preferable to transmit these image and sound as well, to the mobile-phone base station 41. Furthermore, in the future, as the automatic notification system is widely developed in society, a mechanism for automatically collecting emergency call information by a mechanism different from the existing emergency call form may be adopted.

The mobile-phone base station 41 receives the issued emergency request transmitted from the information processing device 20f (Step S120) and transfers the received issued emergency request to a transmission destination specified by the emergency call 110 or 119. At the transmission destination, a determination (dispatching an emergency vehicle, etc.) for the emergency request is made on the basis of the issued emergency request transferred (Step S121). The issued emergency request is stored in the regional server 40 or the like according to a result of the determination made in Step S121 (Step S122).

A terminal device as a primary node that has received the SOS packet first may be held by an offender who is trying to harm the user of the event notification device 10a that has transmitted the SOS packet first. In this case, there is a possibility that the SOS packet may be destroyed before relay transmission of the SOS packet is completed. Therefore, it is preferable to transmit the SOS packet to one or more information processing devices 20 configured to receive the SOS packet by relay transmission, for making an emergency call on a plurality of routes. This makes it possible to have a mechanism that is configured to transmit an emergency request signal even if a specific terminal device is destroyed.

In normal use, there is a possibility that an SOS packet transmitted from a root can transmit information such as an image and sound of the surrounding area immediately before a need for an emergency request arises, in addition to minimum emergency request information. For example, there is a possibility that an image captured before a trigger is input due to an event in which the need for an emergency request arises may show the offender or the cause of an accident. When this image or sound information can be received at the same time as or separately from the SOS packet, further transmission of the SOS packet and the information, or storage of the information in the regional server 40 or the like will be supplementary information necessary for rescue or tracking.

As described above, an increase in the amount of information to be transmitted requires a longer communication time required to complete reception of all information. In particular, for example, the event notification device 10*a* may be destroyed by the offender, in issuing an SOS packet and image at the root, or the event notification device 10*b* may be broken before completion of the communication, depending on a damage, in an accident. In other words, there is a possibility that the information issuance capacity of the event notification device 10 may be lost before an issuance of sufficient information is completed at the root.

Therefore, in the embodiment, after the processing of Step S104, the processing of recording information according to the SOS request information is performed by the encryption/transmission request unit 208, in Step S105. More specifically, the encryption/transmission request unit 208 determines the necessity for information recording of the information processing device 20*f* as a reception node receiving the SOS packet by relay transmission, on the basis of information such as position information indicating the position of the root to which the SOS packet has been transmitted first, and the hop count and direction of the root.

When determining that there is the necessity for information recording, the encryption/transmission request unit 208 records the SOS packet, and an image captured by the information processing device 20*f*, for example, in the storage 2003 of the information processing device 20*f*. The mage is preferably recorded at high density. The recording at high density represents recording at high resolution or without decimation. In addition thereto, the recording can include recording in which a portion of an image (e.g., an area including a human face) has a high resolution and the other area has a low resolution.

Note that the encryption/transmission request unit 208 determines the necessity for information recording on the basis of an active level of the SOS request, a relay transmission path, and a record retention/attenuation range. For the active level of the SOS request, for example, a value based on the elapsed time from the generation of the SOS request (transmission of the SOS packet) at the root can be used. For example, the shorter the elapsed time, the higher the active level. A reference time for determining the active level can be changed according to the use (level, etc.) of the SOS packet.

When a plurality of pieces of position information is contained in the SOS packet, the relay transmission path can be determined on the basis of a plurality of pieces of position information about stationary information processing devices 20 and a plurality of pieces of time information corresponding to the position information, the immobile information processing devices 20 including, for example, the immobile information processing device 20*c* of a type representing a security camera provided on a street or the like and the information processing device 20*e* of a type representing a security camera provided at a predetermined building, such as a convenience store.

Furthermore, the record retention/attenuation range is a range in which record is requested and can be determined on the basis of the type contained in the SOS packet. For example, if the type representing an information processing device 20 (e.g., the information processing device 20*f* or 20*g*) that is expected to move with walking is used, the record retention/attenuation range is set to be narrower, and if an information processing device 20 (e.g., the information processing device 20*b*) that is expected to move with a vehicle is used, the record retention/attenuation range is set to be wider.

In the next Step S106, the encryption/transmission request unit 208 requests the communication control unit 202 to transmit the SOS packet according to an information issuance resource. The information issuance resource is compatible with, for example, wired and wireless communication, the information processing device 20*f* is assumed to perform wireless communication, and therefore, the encryption/transmission request unit 208 transmits the SOS packet first and then transmits the image. At this time, the encryption/transmission request unit 208 temporarily stores the image in the buffer 211. In addition, the encryption/transmission request unit 208 generates meta-information or a record retention reference label of information that can be stored in a local or nearby broadband connection device, and supplementarily provides the meta-information or record retention reference label to the regional transport/security monitoring cloud 43 via the mobile-phone base station 41 or the like.

Therefore, the meta-information or the record retention reference label accompanies the regional transport/security monitoring cloud 43 or LDM and makes it possible to generate a record map, and a map closely relating a corresponding region, relating to tracking of an offender or an induction factor of an accident associated with automatic driving, and allowing reference to record retention information live can be generated. Furthermore, it is also possible to download information obtained by encryption of the local information or confirm detailed information for decryption, when a point on an individual map is designated as needed.

Here, in transmission of recorded information via the mobile-phone base station 41 in Step S106, information limited so as not to cause congestion in a communication infrastructure in a communication environment, such as a still image extracted from a moving image to reduce the amount of information, is transmitted, and information such as a high-resolution and high-density image, is temporarily stored, for example, in the buffer 211.

In the next Step S107, information such as an image stored in the buffer 211 can be transmitted in a communication environment enabling transmission of a relatively large amount of data, such as a wireless LAN access point, for example, a Wi-Fi (registered trademark) hotspot. The transmitted information is stored, for example, by the regional server 40.

In the next Step S108, the encryption/transmission request unit 208 determines whether the use of the information processing device 20*f* is finished. If it is determined that the use of the information processing device 20*f* is not finished, the process returns to Step S100. On the other hand, if it is determined that the use of the information processing device 20*f* is finished, a series of the steps of the process according to the flowchart of FIG. 10 is finished.

Note that the SOS packet transmitted in Step S106 is relayed and transmitted to an unspecified number of other nodes (information processing devices 20) (Step S130). In other words, the processing of steps S100 to S108 in the flowchart of FIG. 10 can also be considered as processing relating to the SOS packet transmitted in Step S130.

Here, likewise a node to which the SOS packet is transmitted, a node as a transmission destination to which the information processing device 20*f* transmits an image or the like is configured to transmit an SOS packet to which an ID for identifying an event is added, to the regional transport/security monitoring cloud 43 or the like. This makes it possible to directly browse a location distribution of high-precision and high-density data locally stored in the middle of transmission of the SOS packet relating to the ID. Therefore, on the other hand, it is unnecessary to transmit all information to a wireless or wired network, thus avoiding excessive transmission capacity.

In the above description, the image captured by the event notification device 10 as the root or each information processing device 20 as a node is not directly transmitted to the regional transport/security monitoring cloud 43 at the center. This is because the image has information from a wide range including an area where an event for which an SOS packet is transmitted first occurs and, for example, a route along which an offender escapes, and the image has a large amount of information. Therefore, if a large amount of information is transmitted each time an event occurs, the amount of information transmitted to a communication band of communication infrastructure becomes excessive, and thus, transmission of necessary information may be delayed. Another reason is that it is considered that the necessary information stochastically attenuates as the necessary information spreads farther from the point where the event occurs, and is often wasted.

It is considered that an image or the like captured by the event notification device 10 as the root or each information processing device 20 as a node is temporarily saved in a free area of a node or the like in relay transmission so as to be extracted as needed avoiding unnecessary transmission of the information, leading to well-balanced operation.

Here, encryption performed upon temporarily locally saving is important from the viewpoint of privacy preservation. At the same time, reducing the browsability by encryption of reading necessary information upon issuing an emergency request at the root makes it possible to quickly transmit some information about an event occurrence point to an emergency call 110 or the like to which the emergency request is made. In addition, it is possible to have a mechanism by which unlimited personal control by a public organization while achieving the protection of privacy by setting reading by a public organization, such as the emergency call 110 or 119, to restricted automatic decryption and setting reading by non-public operation to individually identifiable, browse restricted decryption.

The reading-restricted automatic decryption for a public institution may be set to prevent decryption of stored information, when there is no agreement of an individual or his/her family, in a region where residents have voted for disapproval of browsing, for example, as in the confirmation of votes by a Supreme Court justice through browsing authorized by a public organization in election or the like. In order to reduce the risk of malicious recording and browsing, for a technology that can identify a cryptanalyst, decryption is performed via a decryption instruction identifiable authentication server, and a function of limiting browsing to an authorized people may be added to a device configured to receive a decryption instruction, by a public or quasi-public organization, such as police or fire service, or regional crime prevention, regional security, or road traffic control company.

As described above, in the embodiment, in the event notification device 10 having one or more information acquisition functions, such as the imaging function and the sound collection function, an input of a trigger according to the occurrence of an event shifts the operation mode of the event notification device 10 to the alert mode, and an image or the like is captured. Thus, an image is acquired that may be involved in the event and is likely to show another person (e.g., an offender) being around the event notification device 10. Furthermore, when the user almost actually suffers damage or the event notification device 10 itself is about to be damaged or the event notification device 10 is almost stolen, the event notification device 10 transmits an SOS packet automatically or by short-range communication, V2V or V2X communication, or the like, in response to operation to the event notification device 10.

At this time, a transmittable detailed image is transmitted subsequent to the SOS packet before the event notification device 10 is, for example, destroyed. The transmitted SOS packet and detailed image are relayed and transmitted, for example, by using an information processing device 20*f* that the user holding the event notification device 10 has additionally on the spot, an information processing device 20*f* held by the offender, an information processing device 20*a* as a door phone with a short-range communication function, an information processing device 20*c* as a security camera, a home Wi-Fi (registered trademark) node, and the like.

A lower-generation node having a remote wireless communication function such as a mobile phone line transmits an emergency call 110 or 119, and at the same time, picks up the detailed images before and after occurrence of the event that are received from the event notification device 10 being a transmission source of the SOS packet and buffers the detailed images. For example, when entering a broadband communication environment such as a Wi-Fi (registered trademark) hotspot, the lower-generation node transmits the picked-up detailed images to, for example, the regional server 40 and further generates a map on the basis of stored information, in the regional transport/security monitoring cloud 43 or the like. This makes it possible to create a residual tracking information map information on the basis of SOS packet dispersion due to relay transmission. Furthermore, this makes it possible to efficiently acquire a residual before-and-after factor information map showing before-and-after factors of an accident or incident caused by an autonomous vehicle, and trackable information.

When a nomad device such as the information processing device 20*f* transmits an SOS packet, an initial reception node, that is, a primary or secondary relay transmission node, transmits information such as an image after transmission of the SOS packet depending on a free communication standby area for early transmission of an event occurrence point and event relating information. On the other hand, a node far from the root, for example, a tertiary, quartic, or subsequent relay transmission node mainly functions to diffuse event information. Therefore, when the meta-information stored in each information processing device 20 is collected as a map, for example, in the regional transport/security monitoring cloud 43 or the like, it is possible to perform a later browsing search and extraction of necessary information. For example, in LDM update in response to automatic driving, in a case where a local high-bandwidth V2X communication network is fully equipped, image information or the like may be transmitted to local server on the side of infrastructure.

Figure 11:
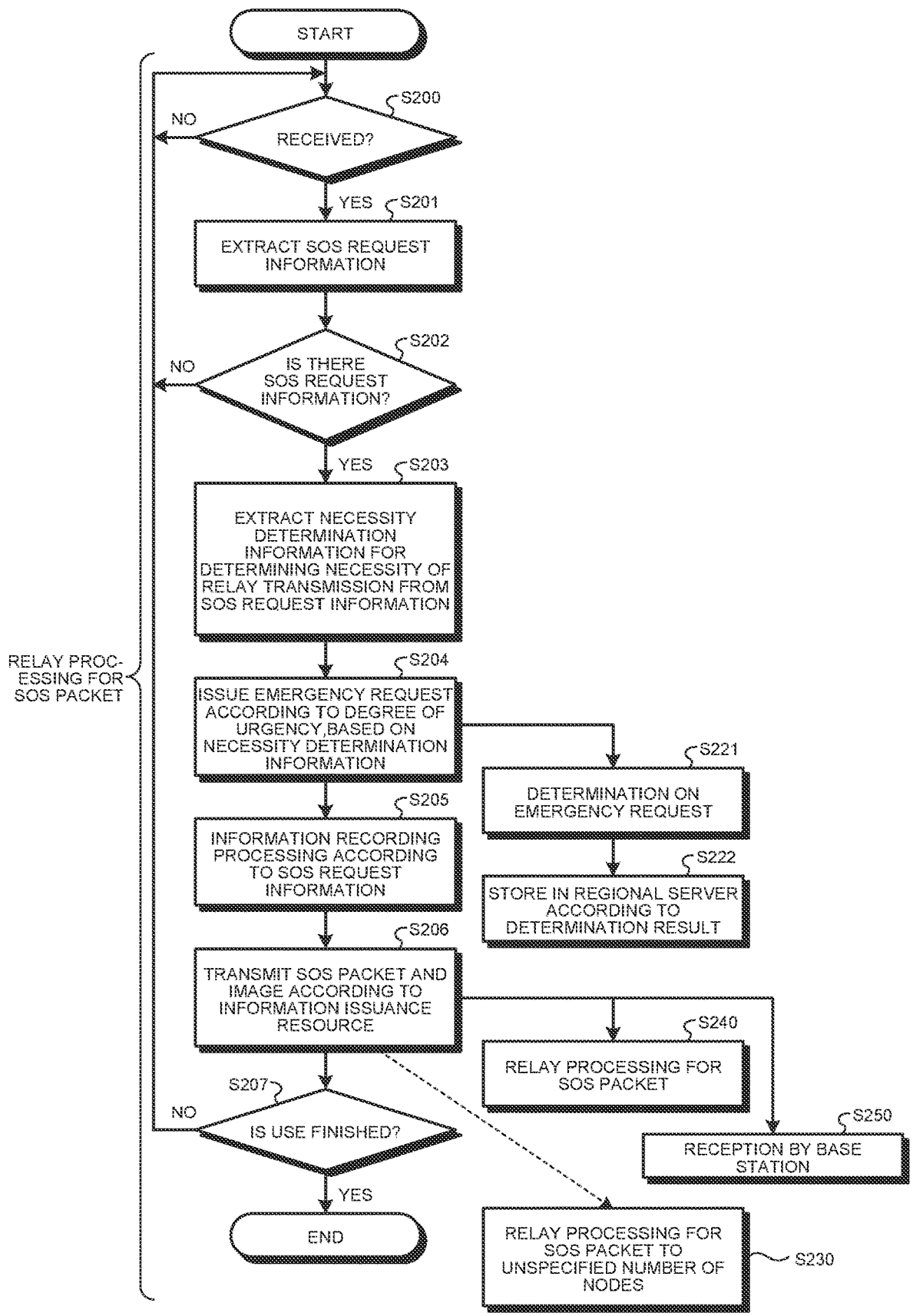
FIG. 11 is a flowchart illustrating an example of another process in an information processing device according to an embodiment.

FIG. 11 is a flowchart illustrating an example of another process in an information processing device 20 according to an embodiment. Here, the process illustrated in the flowchart of FIG. 11 shows an example of a process performed by a fixed device, that is, the information processing device 20*a*, 20*c*, 20*d*, 20*e*, or the like, such as a security camera, that is assumed to perform wired communication without movement in position. In the following description, an example of the information processing device 20c as a security camera, of the information processing devices 20a, 20c, 20d, and 20e will be described. Here, for the sake of explanation, it is assumed that the information processing device 20c is directly connected, for example, to the network 2.

The process according to Step S200 to Step S206 according to the flowchart of FIG. 11 is similar to that of Step S200 to Step S206 according to the flowchart of FIG. 10 described above. In other words, in Step S200, as in Step S100 of FIG. 10, the event extraction unit 204 of the information processing device 20c determines whether information is received by the short-range communication reception unit 200, for example, on the basis of information from the message decoder 201. If it is determined that no information is received (Step S200, "No"), the process is returned to Step S200, and if it is determined that the information is received (Step S200, "Yes"), the process proceeds to Step S201.

In Step S201, as in Step S101 of FIG. 10, the event extraction unit 204 receives the information received from the message decoder 201, and attempts to extract an SOS request from the received information. In the next Step S202, as in Step S102 of FIG. 10, the event extraction unit 204 determines whether the received information includes the SOS request. If the event extraction unit 204 determines that the received information includes no SOS request (Step S202, "No"), the process returns to Step S200.

On the other hand, if the event extraction unit 204 determines that the received information includes the SOS request (Step S202, "Yes"), the event extraction unit 204 passes the SOS packet to the message analysis unit 206, and the process proceeds to Step S203. The message analysis unit 206 analyzes the received SOS packet and acquires SOS request information contained in the SOS packet. In Step S203, as in Step S102 of FIG. 10, the issuance information generation unit 207 extracts necessity determination information for determining the necessity of relay transmission of the SOS packet from the SOS request information.

In the next Step S204, as in Step S104 of FIG. 10, the encryption/transmission request unit 208 requests the communication control unit 202 to issue an emergency request according to the degree of urgency, on the basis of the necessity determination information obtained in Step S203. The communication control unit 202 transfers the issued emergency request to a transmission destination corresponding to emergency call 110 or 119, for example, via the network 2. At the transmission destination, a determination (dispatching an emergency vehicle, etc.) for the emergency request is made on the basis of the issued emergency request transferred (Step S221). The issued emergency request is stored in the regional server 40 or the like according to a result of the determination made in Step S221 (Step S222).

In the next Step S205, as in Step S105 of FIG. 10, the encryption/transmission request unit 208 performs the processing of recording information according to the SOS request information. In the next Step S206, as in Step S106 of FIG. 10, the encryption/transmission request unit 208 requests the communication control unit 202 to transmit the SOS packet according to an information issuance resource.

Here, in transmission of recorded information via the mobile-phone base station 41 in Step S206, information limited so as not to cause congestion in a communication infrastructure in a communication environment, such as a still image extracted from a moving image to reduce the amount of information, is transmitted, and information such as a high-resolution and high-density image, is temporarily stored, for example, in the buffer 211.

In the next Step S207, as in Step S108 of FIG. 10, the encryption/transmission request unit 208 determines whether the use of the information processing device 20c is finished. If it is determined that the use of the information processing device 20c is not finished, the process returns to Step S200. On the other hand, if it is determined that the use of the information processing device 20c is finished, a series of the steps of the process according to the flowchart of FIG. 11 is finished.

In this example, in Step S206, the SOS packet is relayed and transmitted to the information processing devices 20a, 20c, 20d, 20e, and the like, as other fixed devices, by wired communication (Step S240). In other words, the processing of steps S200 to S207 in the flowchart of FIG. 11 can also be considered as processing relating to the SOS packet transmitted in Step S240.

Note that in Step S206, the SOS packet can also be transmitted by wireless communication. In this case, as in Step S130 of FIG. 10, the transmitted SOS packet is relayed and transmitted to an unspecified number of other nodes (information processing devices 20) (Step S230). Furthermore, in Step S206, the SOS packet can also be transmitted via a mobile phone line. The transmitted SOS packet is received by the mobile-phone base station 41 (Step S250).

Method of Using SOS Packet Applicable to Embodiment

Next, a method of using an SOS packet applicable to an embodiment will be described schematically. FIG. 12A is a diagram illustrating an example of connection to information processing devices 20a to 20g and the regional transport/security monitoring cloud 43, applicable to an embodiment. Furthermore, FIG. 12A is a diagram corresponding to FIG. 3 described above.

In the example of FIG. 12A, an information processing device 20c as a security camera and two information processing devices 20a as a door phone are directly connected to the network 2. Therefore, SOS packets and images transmitted from the information processing device 20c and the two information processing devices 20a are directly transmitted to the regional transport/security monitoring cloud 43 via the network 2.

On the other hand, since the other information processing devices 20b, 20b', 20d, 20e, and 20f are not connected to the network 2, SOS packets and images to be transmitted are finally received by the mobile-phone base station 41 via the mobile phone line and transmitted from the mobile-phone base station 41 to the regional transport/security monitoring cloud 43 via the network 2.

Figure 12B:
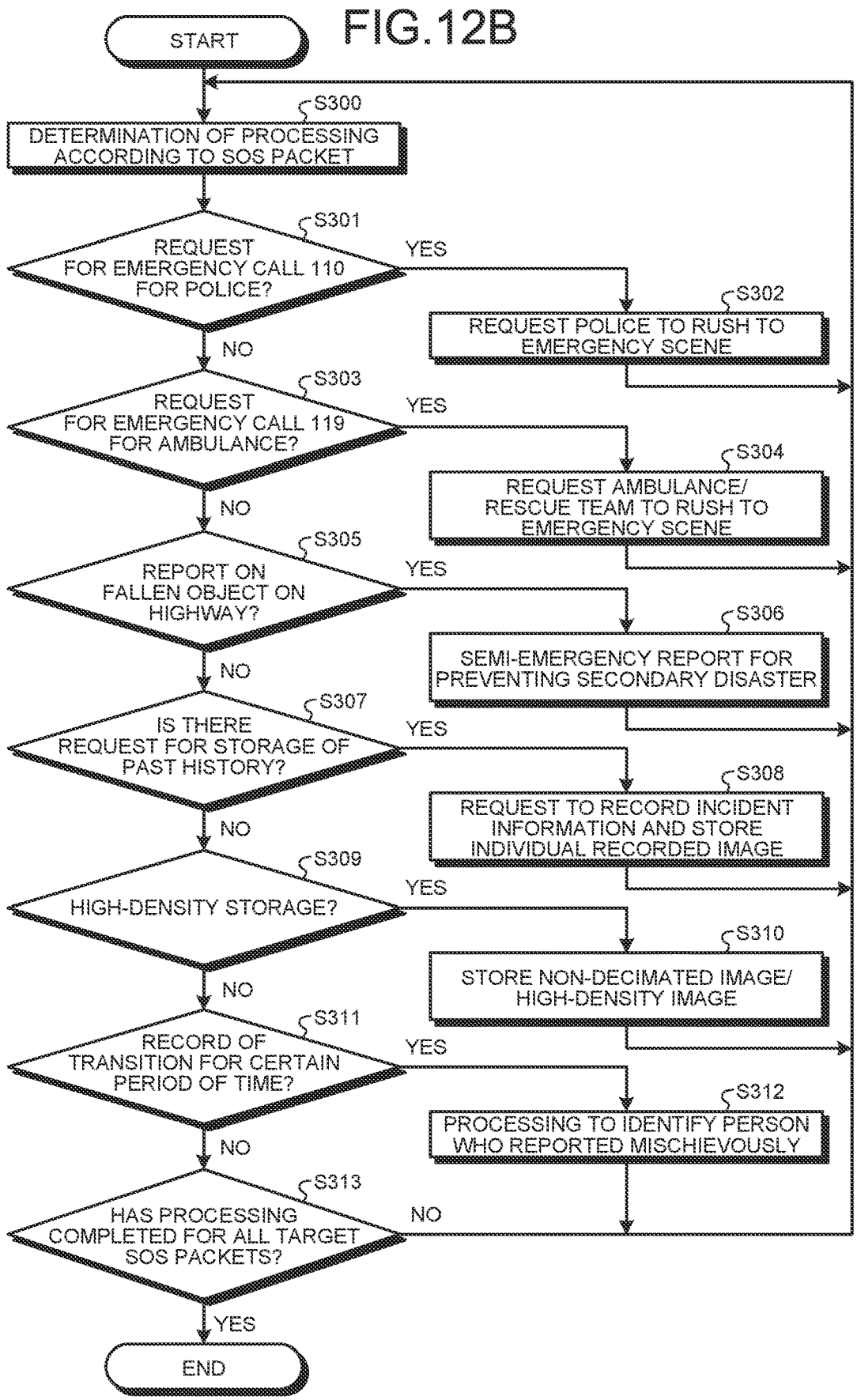
FIG. 12B is a flowchart illustrating an example of processing using an SOS packet and an image in a regional transport/security monitoring cloud.

FIG. 12B is a flowchart illustrating an example of processing using an SOS packet and an image in the regional transport/security monitoring cloud 43. In Step S300, the regional transport/security monitoring cloud 43 extracts one SOS packet and starts determination of processing according to the extracted SOS packet. For example, the regional transport/security monitoring cloud 43 sorts received SOS packets on the basis of, for example, the levels contained in the SOS packets, and performs processing in order from an SOS packet having the highest level.

In the next Step S301, the regional transport/security monitoring cloud 43 determines whether the SOS packet is an SOS packet that requests for emergency call 110, for example, on the basis of the type contained in the SOS packet. If the regional transport/security monitoring cloud 43 determines that the SOS packet is the SOS packet that requests for emergency call 110 (Step S301, "Yes"), the process proceeds to Step S302, and the regional transport/security monitoring cloud 43 requests the police to rush to the emergency scene. The site location can be obtained on the basis of the position information contained in the SOS packet or the position information contained in an SOS packet including the same ID as the SOS packet. After the processing of Step S302, the process is returned to Step S300.

Note that, here, in Step S302, it is described that requests are made for police emergency dispatch for all SOS packets for which requests for emergency call 110 are determined to be made in Step S301, but the processing is not limited to this example. For example, priority determination processing may be further performed on requests for the emergency dispatch, according to a determination result based on the basis of an analysis result of analyzing information contained in the SOS packets that are determined to make requests for emergency call 110 in Step S301, and information obtained from information relating to the SOS packets and distributed and stored.

In Step S301, if the regional transport/security monitoring cloud 43 determines that the SOS packet is not the SOS packet that requests for emergency call 110 (Step S301, "No"), the process proceeds to Step S303.

In Step S303, the regional transport/security monitoring cloud 43 determines whether the SOS packet is an SOS packet that requests for emergency call 119, for example, on the basis of the type contained in the SOS packet. If the regional transport/security monitoring cloud 43 determines that the SOS packet is the SOS packet that requests for emergency call 119 (Step S303, "Yes"), the process proceeds to Step S304, and the regional transport/security monitoring cloud 43 requests the ambulance to rush to the emergency scene. After the processing of Step S304, the processing is returned to Step S300.

Note that the determination in Step S301 and Step S303 can be performed on the basis of, for example, the type contained in the SOS packet. For example, when the type contained in the SOS packet indicates a security notification device or an in-vehicle device, it can be determined that the SOS packet is an SOS packet that requests for emergency call 110. On the other hand, when the type contained in the SOS packet indicates a request for an emergency vehicle, such as a fire engine or ambulance, it can be determined that the SOS packet is an SOS packet that requests for emergency call 119.

In Step S303, if the regional transport/security monitoring cloud 43 determines that the SOS packet is not the SOS packet that requests for emergency call 119 (Step S303, "No"), the process proceeds to Step S305.

In Step S305, the regional transport/security monitoring cloud 43 determines whether the SOS packet is an SOS packet that reports a fallen object on a highway or the like, for example, on the basis of the type contained in the SOS packet. If the regional transport/security monitoring cloud 43 determines that the SOS packet is the SOS packet that reports a fallen object on a highway or the like (Step S305, "Yes"), the process proceeds to Step S306, and the regional transport/security monitoring cloud 43 reports quasi-emergency, for example, to a control department of a public road corporation that manages the highway, preventing secondary disaster. After the processing of Step S306, the processing is returned to Step S300.

Note that in the processing of Step S306, an LDM update cloud server may be notified of an update event accompanying the report of the fallen object.

Note that in the determination of Step S305, for example, when an operation for reporting the fallen object is performed in an information processing device 20b as an in-vehicle device, the information processing device 20b stores a value indicating the fallen object as the type, in the SOS packet. The regional transport/security monitoring cloud 43 makes a determination in Step S305 on the basis of this value of the type.

For the report of road abnormality or the like, accurate recognition can be achieved with high probability within a range where a road space being a vehicle travel environment is improved to some extent and environmental recognition is improved by an autonomous recognizer mounted to a vehicle, in the future spread of automatic driving that depends on development of LDM to some extent. On the other hand, rare information appears on roads that is difficult to recognize and discriminate by an autonomous system, such as floating bags, fallen objects, or fallen trees, whose shape or behavior is unspecified. In the autonomous system, desirably, an unexpected event is promptly reflected to the LDM server, and a vehicle behind approaching the event generation point is accurately and previously notified of information that a vehicle ahead encounters. In other words, there is a risk that the vehicle behind approaching the event generation point may perform control suddenly, for example, turn the steering wheel or brake suddenly to evade such an unexpected obstacle, and it is critical to update information of the LDM server.

In Step S305, if the regional transport/security monitoring cloud 43 determines that the SOS packet is not the SOS packet that reports a fallen object on a highway or the like (Step S305, "No"), the process proceeds to Step S307.

In Step S307, the regional transport/security monitoring cloud 43 determines whether the SOS packet is a packet that requests storage of a past history, for example, on the basis of the information contained in the SOS packet. For example, information for requesting storage of a past history is added to a configuration of the SOS packet illustrated in FIG. 8A or FIG. 8B. If the regional transport/security monitoring cloud 43 determines that the SOS packet is the packet that requests storage of a past history, on the basis of the information added to the SOS packet (Step S307, "Yes"), the process proceeds to Step S308.

For example, in Step S308, the regional transport/security monitoring cloud 43 records incident information and stores individual recorded images. More specifically, the regional transport/security monitoring cloud 43 records the incident information (e.g., the SOS packet itself) and stores images transmitted from an information processing device 20c and an information processing devices 20e, which are security cameras in the region, and images transmitted from an information processing device 20b, which is an in-vehicle device. This is processing of saving an overwriting target image against overwriting older information by cyclic recording in these information processing devices 20b, 20c and 20e. After the processing of Step S308, the process is returned to Step S300.

In Step S307, if the regional transport/security monitoring cloud 43 determines that the SOS packet is not the packet that requests storage of a past history (Step S307, "No"), the process proceeds to Step S309.

In Step S309, the regional transport/security monitoring cloud 43 determines whether to perform high-density storage of images transmitted from the event notification devices 10a and 10b and the information processing devices 20a to 20g, for example, on the basis of the information contained in the SOS packet. For example, information that indicates high-density storage of an image is added to the configuration of the SOS packet illustrated in FIG. 8A or FIG. 8B. If the regional transport/security monitoring cloud 43 determines that the SOS packet is the packet that performs high-density storage of an image, on the basis of the information added to the SOS packet (Step S309, "Yes"), the process proceeds to Step S310.

In Step S310, the regional transport/security monitoring cloud 43 performs high-density storage of an image corresponding to the SOS packet or storage of the image without decimation. After the processing of Step S310, the process is returned to Step S300.

In Step S309, if the regional transport/security monitoring cloud 43 determines that the SOS packet is not a packet that indicates high-density storage of an image (Step S309, "No"), the process proceeds to Step S311.

In Step S311, the regional transport/security monitoring cloud 43 makes a determination on the basis of a record of transition for a certain period of time, for the SOS packet transmitted from a specific event notification device 10. For example, on the basis of the time information contained in the SOS packet, it is determined whether time points at which SOS packets are transmitted multiple times from the specific event notification device 10 are, for example, in the similar time slot of a day over multiple days. If it is determined that the time points are in the similar time slot of a day over multiple days (Step S311, "Yes"), the process proceeds to Step S312.

In Step S312, the regional transport/security monitoring cloud 43 considers that the SOS packet was transmitted, for example, mischievously. Here, to make this determination, it is necessary to include, into the SOS packet, information that can identify an individual. If the regional transport/security monitoring cloud 43 considers that the SOS packet is transmitted, for example, mischievously, the regional transport/security monitoring cloud 43 identifies the user who has transmitted the SOS packet and takes measures (e.g., suspends use of the information processing system 1). After the processing of Step S310, the process is returned to Step S300.

By identifying a person who gives notification in Step S312, effective suppression of repetitive intentional transmission of an SOS packet having false request by an offender who enters a trigger to a victim's event notification device 10 due to bullying, or abuse of the event notification device 10 can be expected.

In Step S311, if the regional transport/security monitoring cloud 43 determines that the time points at which the SOS packets are transmitted are not in the similar time slot of a day over multiple days (Step S311, "No"), for example, the process proceeds to Step S313.

Note that in Step S311, instead of the above description, for example, it may be determined whether the SOS packet is transmitted multiple times within a predetermined time range from the specific event notification device 10. If it is determined that the SOS packet is transmitted multiple times within the predetermined time range, the SOS packet is determined to have a high degree of urgency, and, for example, it is considered that the regional transport/security monitoring cloud 43 gives priority to processing corresponding to the SOS packet.

In Step S313, the regional transport/security monitoring cloud 43 determines whether the processing is finished for all the target SOS packets. If it is determined that the processing is not finished for all the SOS packets (Step S313, "No"), the process returns to Step S300. On the other hand, if it is determined that the processing is finished for all the SOS packets, a series of the steps of the process according to the flowchart of FIG. 12B is finished.

Figure 13:
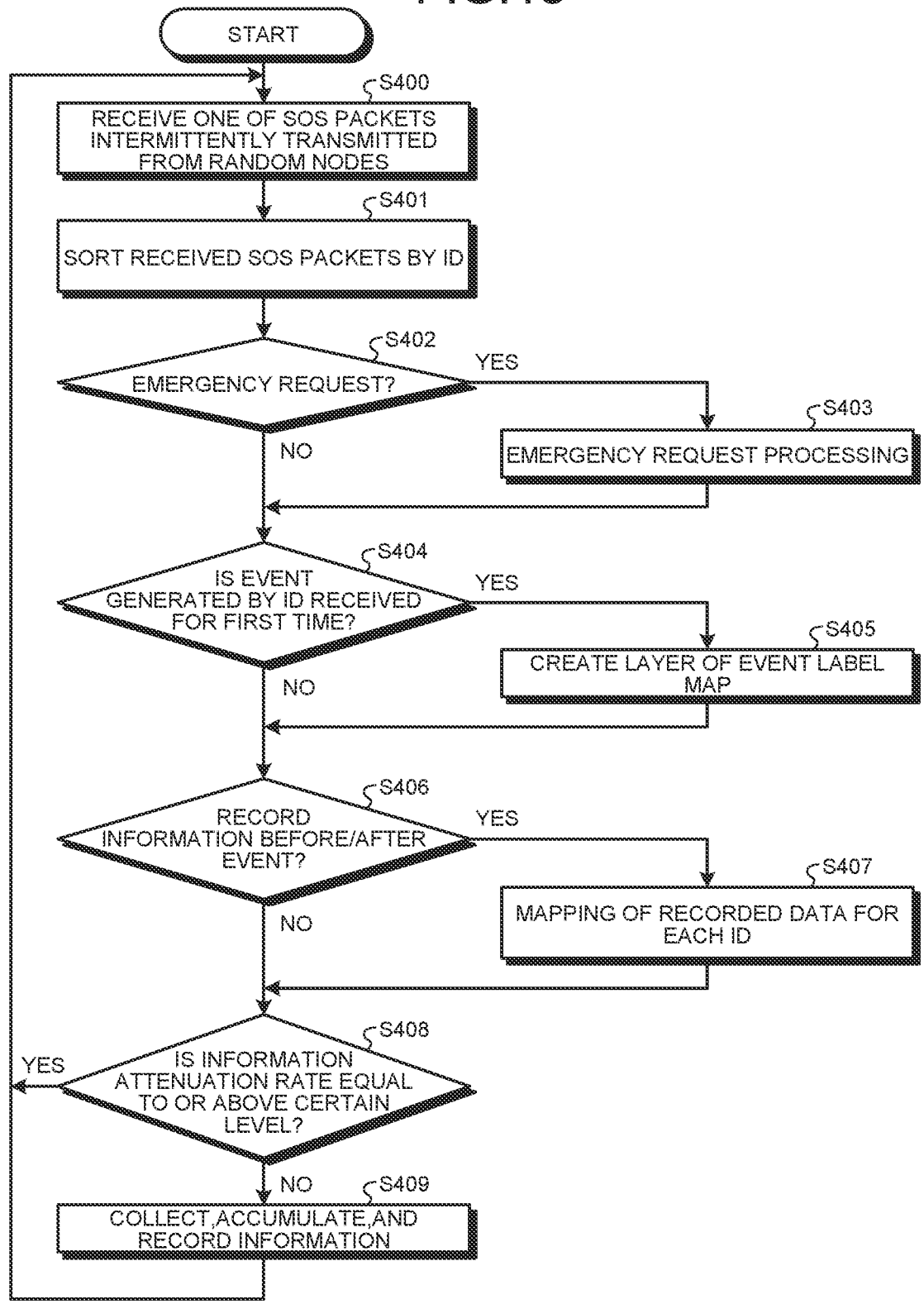
FIG. 13 is a flowchart illustrating an example of a record map generation process in a regional transport/security monitoring cloud, applicable to an embodiment.

FIG. 13 is a flowchart illustrating an example of a record map generation process in the regional transport/security monitoring cloud 43, applicable to an embodiment. In Step S400, the regional transport/security monitoring cloud 43 receives one of SOS packets intermittently transmitted from random nodes. In the next Step S401, the regional transport/security monitoring cloud 43 classifies the SOS packet received in Step S400 according to the ID.

In the next Step S402, the regional transport/security monitoring cloud 43 determines whether the SOS packet is an SOS packet for emergency request on the basis of the level contained in the SOS packet received in Step S400. If the regional transport/security monitoring cloud 43 determines that the SOS packet is not the SOS packet for emergency request (Step S402, "No"), the process proceeds to Step S404. On the other hand, if the regional transport/security monitoring cloud 43 determines that the SOS packet is the SOS packet for emergency request (Step S402, "Yes"), the process proceeds to Step S403, performs emergency request processing, and the process proceeds to Step S404.

In Step S404, the regional transport/security monitoring cloud 43 determines whether the ID contained in the SOS packet received in Step S400 is an ID received for the first time, on the basis of a result of the classification in Step S401. If the regional transport/security monitoring cloud 43 determines that the ID contained in the SOS packet is an ID that has already been received (Step S404, "No"), the process proceeds to Step S406. On the other hand, if the regional transport/security monitoring cloud 43 determines that the ID contained in the SOS packet is the ID received for the first time (Step S404, "Yes"), the process proceeds to Step S405, and the regional transport/security monitoring cloud 43 generates a new event map layer.

Figure 14:
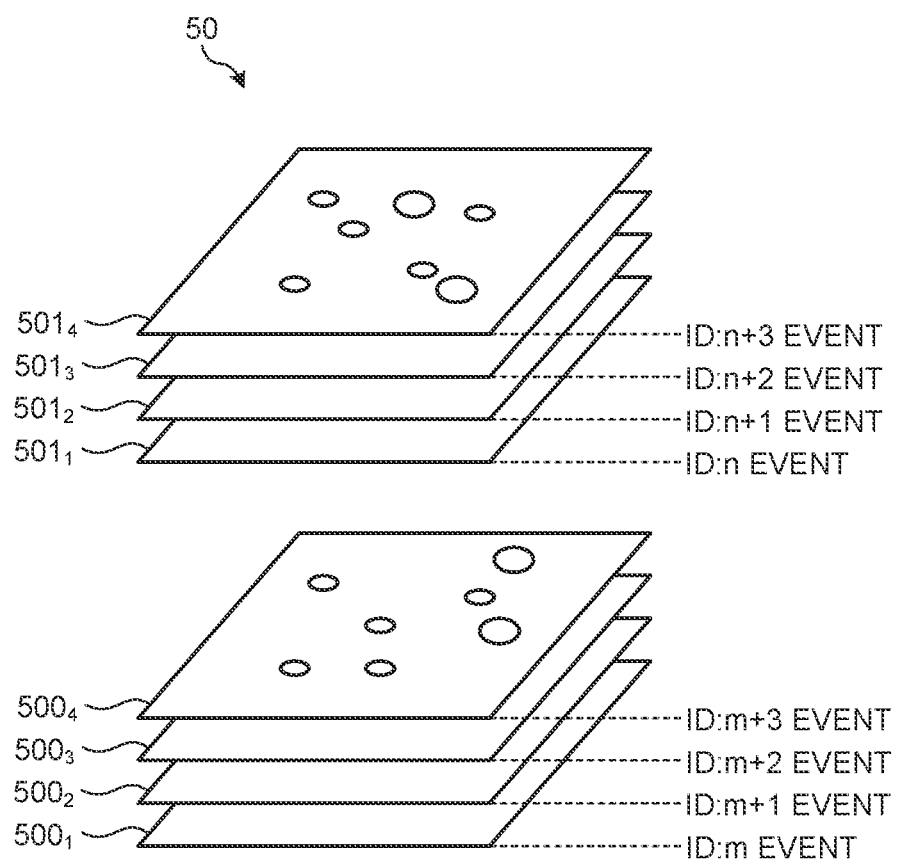
FIG. 14 is a diagram illustrating an example of an event map applicable to the embodiment.

FIG. 14 is a diagram illustrating an example of an event map applicable to an embodiment. In the event map 50, one layer is generated for each ID of an SOS packet. In the example of FIG. 14, the event map 50 includes eight layers of a layer $500_1$ for an ID corresponding to an m event, a layer $500_2$ for an ID corresponding to an m+1 event, a layer $500_3$ for an ID corresponding to an m+2 event, and a layer $500_4$ for an ID corresponding to m+3 event, and further includes a layer $501_1$ for an ID corresponding to an n event, a layer $501_2$ for an ID corresponding to an n+1 event, a layer $501_3$ for an ID corresponding to an n+2 event, and a layer $501_4$ for an ID corresponding to an m+4 event.

Furthermore, for example, the layers $500_1$ to $500_4$ are layers based on IDs transmitted from the event notification device 10a which is a security notification device, and the layers $501_1$ to $501_4$ are layers based on IDs transmitted from the event notification device 10b which is an in-vehicle device, and as described above, the layers $500_1$ to $500_4$ and $501_1$ to $501_4$ can be classified according to the type of an event notification device 10 that transmits the SOS packet first.

As an example, when an SOS packet containing an ID received for the first time is received while the layers $500_1$ to $500_3$ have already been created, a layer (e.g., layer $500_4$) corresponding to the ID is generated and added to the layers $500_1$ to $500_3$. The generated layer $500_4$ is mapped on the basis of the position information contained in the SOS packet. The information indicating the level or the time information that is contained in the SOS packet may be included for the mapping.

Returning to the description of FIG. 13, when the layer corresponding to the ID received for the first time is generated in Step S405, the process proceeds to Step S406. In Step S406, the regional transport/security monitoring cloud 43 determines the necessity of storing a record around an event occurrence location before or after the event relating to transmission of the SOS packet by the event notification device 10a or 10b. Note that the determination in Step S406 is made according to a predetermined definition. If the regional transport/security monitoring cloud 43 determines that there is no necessity of storing the record (Step S406, "No"), the process proceeds to Step S408.

On the other hand, when the regional transport/security monitoring cloud 43 determines in Step S406 that there is the necessity of storing the record (Step S406, "Yes"), the process proceeds to Step S407. In Step S407, the regional transport/security monitoring cloud 43 adds information to the layer corresponding to the ID included in the SOS packet received in Step S400. The information to be added is, for example, mapping information based on the position information added last to the SOS packet. In this way, by sequentially adding information about SOS packets including an ID corresponding to the layer, a propagation route of the information about each ID can be visualized. This makes it possible to readily search for related information about each specific event.

Note that when storing a record before the event, the record of an event that has occurred before the event relating to the SOS packet received in Step S400 is retained. For example, if an n+4 event in FIG. 14 represents the event that has occurred this time, the records of the n+3 event, n+2 event, and n+1 event that have occurred before the event are retained. Likewise, when storing a record after the event, the record of an event that has occurred after the event relating to the SOS packet received in Step S400 is retained. For example, if the 1+4 event in FIG. 14 is the event that has occurred this time, the records of the n+2 event, n+3 event, and n+4 event that have occurred after the event are retained. As a matter of course, the records of events before and after an event may be stored individually.

As described above, storing an event that occurs in an area, as the mapping information facilitates, for example, makes it easy to track an offender or the like or predict an escape route. Furthermore, due to disclosing the existence of this mapping information, a deterrent effect against criminal acts can be also expected.

The information mapped to the individual layers can include further detailed information, such as information for each recording time, recorded information, the number of moving objects or amount of movement that are detected from the recorded information, person, gender, type of a vehicle, type of a recording camera (installed security camera, camera installation direction, front and rear in-vehicle monocular cameras, down-looking quad camera, door phone type, etc.), locally recorded information, resolution, or the like. Furthermore, the information distribution may be further visualized by color-coding the information mapped according to the type, extracting metadata, or the like.

Note that when the information classification is not performed properly, information will be overloaded, the burden of searching for necessary information will increase, and there is a possibility of a delay in determination or the burying of important information. Therefore, it is desirable to convert information into metadata or store and manage information, while performing regular and appropriate review according to the region, scale, and usage.

Returning to the description of FIG. 13, if the processing of layer generation in Step S407 is finished, the process proceeds to Step S408. In Step S408, the regional transport/ security monitoring cloud 43 determines whether an attenuation rate of information contained in the SOS packet received in Step S400 is equal to or above a certain level. Here, it is assumed that the attenuation rate of information is determined on the basis of the time information contained in the SOS packet. For example, when the time information shows a predetermined elapsed time, such as 10 minutes, one hour, one day, from the current time, it is determined that the attenuation rate is equal to or above the certain level. If the regional transport/security monitoring cloud 43 determines that the attenuation rate is equal to or above the certain level (Step S408, "Yes"), the process returns to Step S400, and processing for the next SOS packet is performed.

On the other hand, if the regional transport/security monitoring cloud 43 determines that the attenuation rate of the information is not equal to or above the certain level (Step S408, "No"), the process proceeds to Step S409. In Step S409, the regional transport/security monitoring cloud 43 collects, accumulates, and records the SOS packet received in Step S400 and information relating to the SOS packet. For example, the SOS packet and an image transmitted corresponding to the SOS packet are accumulated and recorded.

If the processing of Step S409 is finished, a series of the steps of the process according to the flowchart of FIG. 13 is finished.

Note that the regional transport/security monitoring cloud 43 is configured to delete the SOS packets and images accumulated and recorded in Step S409, after a predetermined period of time. For example, it can be considered that the regional transport/security monitoring cloud 43 sets the period until the deletion according to the level contained in the SOS packet. More specifically, the higher the level, the longer the period for storage. Furthermore, when the event relating to the SOS packet is some kind of incident, it can be considered that the SOS packet and the image are stored until the accident is resolved. It is possible to investigate whether the SOS packet is involved in an incident, for example, on the basis of the ID included in the SOS packet.

In the present disclosure, the event notification device 10b as an in-vehicle device is configured so that collision on a side of the vehicle, scraping that does not affect the dynamic motion of the vehicle body, detection of sound wave of sound of horn or the like, and external signal request (sound, radio wave, light, signal, etc.) can be a trigger for transmitting an SOS packet. Furthermore, detection of tailgating from the front or rear side of the vehicle, for example, detection of an approaching vehicle ahead or behind on the basis of an image of a front or rear in-vehicle camera, is performed, automatic detection, such as detection of abnormal approaching steering during driving, detection of sudden deceleration/braking in front of the vehicle, detection of cutting in front of the vehicle, or detection of pulling over, is performed, and the detected information is locally recorded, automatically transmitted to a remote place by wireless communication, and saved.

Figure 16:
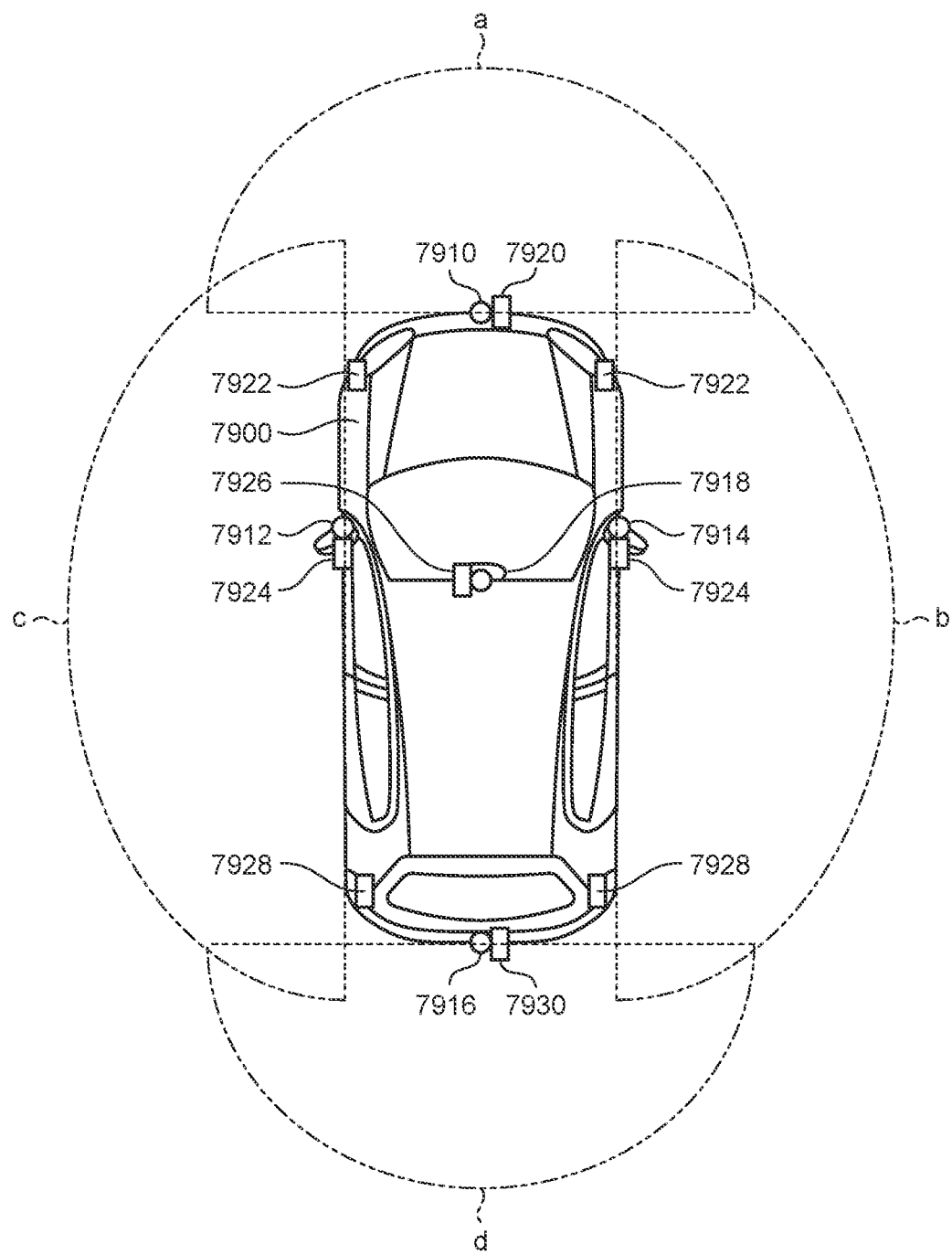
FIG. 16 is a diagram illustrating an example of installation positions of imaging devices of a data acquisition unit.

For example, as illustrated in FIG. 16 described later, moving image information all around a vehicle can be captured with an in-vehicle camera system that is mounted to a vehicle and configured to look down and monitor the whole circumference of the vehicle. Therefore, presenting the features of each recorded information on the mapping as in this example facilitates quick understanding of neighborhood information. Furthermore, a vehicle can be considered in which cameras each having a field of view directed outward from the vehicle are mounted to be directed to all directions including the front, rear, left, and right sides of the vehicle. In this case, the vehicle may suffer damage from an accident caused by an external cause such as a collision, from a direction different from the front side, and, for example, vehicle control may be suddenly lost in an automatic driving control system due to the damage. If such a situation is understood for each detected information, operation in which the search for necessary information in an emergency can be found in more detail and reliably becomes possible.

Detection of an event may include an automatic detection, an automatic transmission and manual detection, and a manual transmission function. Note that in order to avoid recording malicious peripheral visual information in manual detection and manual transmission, it is preferable for the manual transmission to employ the combination of data encryption and a mechanism of avoiding acquisition/recording of malicious information by identifying the user, such as decryption by limiting a cryptanalyst using personal authentication, to avoid browsing even by a person him/herself who inputs a trigger or a device held by the person.

Manual input of a trigger and transmission of an SOS packet has the advantage to enable socially monitor a malicious driver, recording/transmission using an SOS packet representing an event, such as an ill-serviced vehicle, illegal overloading vehicle, overload on a highway, or responsibility to a fallen object, a notification system facilitating detection of the fallen object that is difficult to detect automatically, and the like to effectively prevent the spread of damage. The present disclosure is also applicable to accident prevention, such as early notification of a vehicle running unstably.

In addition, as a special use, the present disclosure is applicable to manual transmission or the like according to premonition of disaster, when there is a need to notification without involvement into an accident or criminal. In this case, the event notification device 10a which is a security notification device, can also be applied. Furthermore, in the case of manual transmission, it is possible to communicate the contents of an event by using a voice inquiry system by an operator.

As described above, the mechanism of information transmission using the SOS packet according to the present embodiment is not limited to the transmission of the SOS packet when there is an influence from an event that has occurred. In other words, the communication function according to the present embodiment is not limited to a function used only when an accident or event has occurred. More specifically, the mechanism of information transmission using the SOS packet according to the present embodiment is extensively applicable to the notification and report of events such as the following (a) to (h). Each of the following events (a) to (h) can be defined, for example, as an event for the event processing unit 205.

(a) Notification of an accident seen during driving on a road.
(b) Notification of a fallen object on a road.
(c) Notification of an incident (e.g., heinous crime) that is witnessed in the neighborhood but the witness doesn't want to get involved directly in the accident.
(d) Notification of a dangerous case where the vehicle cannot stop on the spot.
(d-1) Notification of a fallen object seen during driving on a highway.
(d-2) Notification of information about a detected abnormal object or unidentifiable object that is difficult to determine with a vehicle environment recognition system, such as a floating empty garbage bag or a tree branch.
(e) Notification of the malfunction of lighting equipment or the risk of almost falling equipment of a nearby vehicle.
(f) Report of an improperly loading vehicle or the like that has a risk of falling cargo during driving.
(g) Report of exhaust gas.
(h) Notification of dangerous driving such as tailgating.

The extensive information transmission according to the present embodiment has the advantage to allow information transmission at an event occurrence point by driver's simple operation (button, switch operation, voice notification, gesture, etc.) in a situation where prompt notification is desired but is difficult with an existing mechanism as described above.

It is possible to combine a time-shift recording function of an existing dashboard camera or the like with a mechanism of promptly issuing information relating to the occurrence of an event including position information according to the present embodiment. This makes it possible to play a role of a function of giving early notification to people involved to assist the prevention and early resolution of an accident and incident.

As an example, consider a case where a driver of a vehicle who happens to pass a point where an event considered to have a risk to driving occurs becomes the first person to find (vehicle to find) the event. As the events that are considered to have a risk to such driving, a fallen object on the road, freezing of the road surface, disasters (fire, flood, etc.) around the road on which the vehicle is driving, a damaged vehicle, and the like are considered. When the driver happens to pass the point where such an event has occurred, notification of information according to the present embodiment enables immediate notification of the event, and a mechanism of reflecting the risk to LDM information and the like can be formed promptly.

It can be considered that update of the LDM information is performed by a vehicle that has a function configured to constantly acquire information, such as a probe car or a specific road vehicle. Even in this case, not all vehicles passing through a segment constantly update the LDM information, and not all witnessed events are automatically updated by an LDM information update system.

On the other hand, a notification function according to an embodiment allows a driver of a passing vehicle passing in the vicinity of an event to give notification at his/her judgement, and the possibility of a risk can be notified of by an actual witness. Therefore, the notification function enables to determine a situation that is difficult for only an automatic driving device to detect independently and autonomously and the notification function also compensates for incompleteness of the LDM information automatically updated.

Furthermore, application of the notification function according to an embodiment to automatic driving, or the like enables immediate improvement of processing performance in security beforehand, for example, by previous deceleration for approaching preparation, even if influence on driving cannot be determined.

In addition, as a road segment setting, consider a case where a predetermined event occurs in an itinerary of a road segment through which passing with an automatic driving level of "4" (fully automatic driving) is allowed. In this case, by applying the notification function according to an embodiment to the automatic driving, the level of the automatic driving can be corrected to "3" or lower (automatic driving is possible, but driver is demanded to follow the request from the system) for a vehicle approaching a place where the event occurs, in a corresponding segment, facilitating entry and passage into the segment.

An existing technology has difficulty in taking a motion beyond the avoidance by a driver by him/herself, even if there is a dangerous fallen object during driving. However, the notification function according to an embodiment makes it possible to immediately give external notification of a moving image of driving at a position relating to an event. Furthermore, the notification function according to an embodiment makes it possible to immediately and remotely transmit a moving image which is an evidential record of dangerous driving, such as tailgating, and thereby self-control effect to a driver of dangerous driving can be expected.

Furthermore, in the future, it can be assumed that in a city or the like where vehicles using automatic driving are running, there may be emergency events, such as emergency stop operation by a third party against a vehicle without an occupant including a driver, and manual operation restoration processing against abnormal state (seizures, etc.) of a driver during automatic operation. Therefore, in addition to an image information outside a vehicle, from a passive monitoring result of a driver and a passenger inside the vehicle and automatic detection of the state of an occupant or the like, an observable transition data about the state of the driver in a manual driving return sequence may be added or handled as information notified of by the SOS packet.

Example of Application to Vehicle Capable of Automatic Driving According to Embodiment Next, an example where the above-mentioned event notification device 10b as an in-vehicle device is mounted to a vehicle capable of automatic driving will be described.

Figure 15:
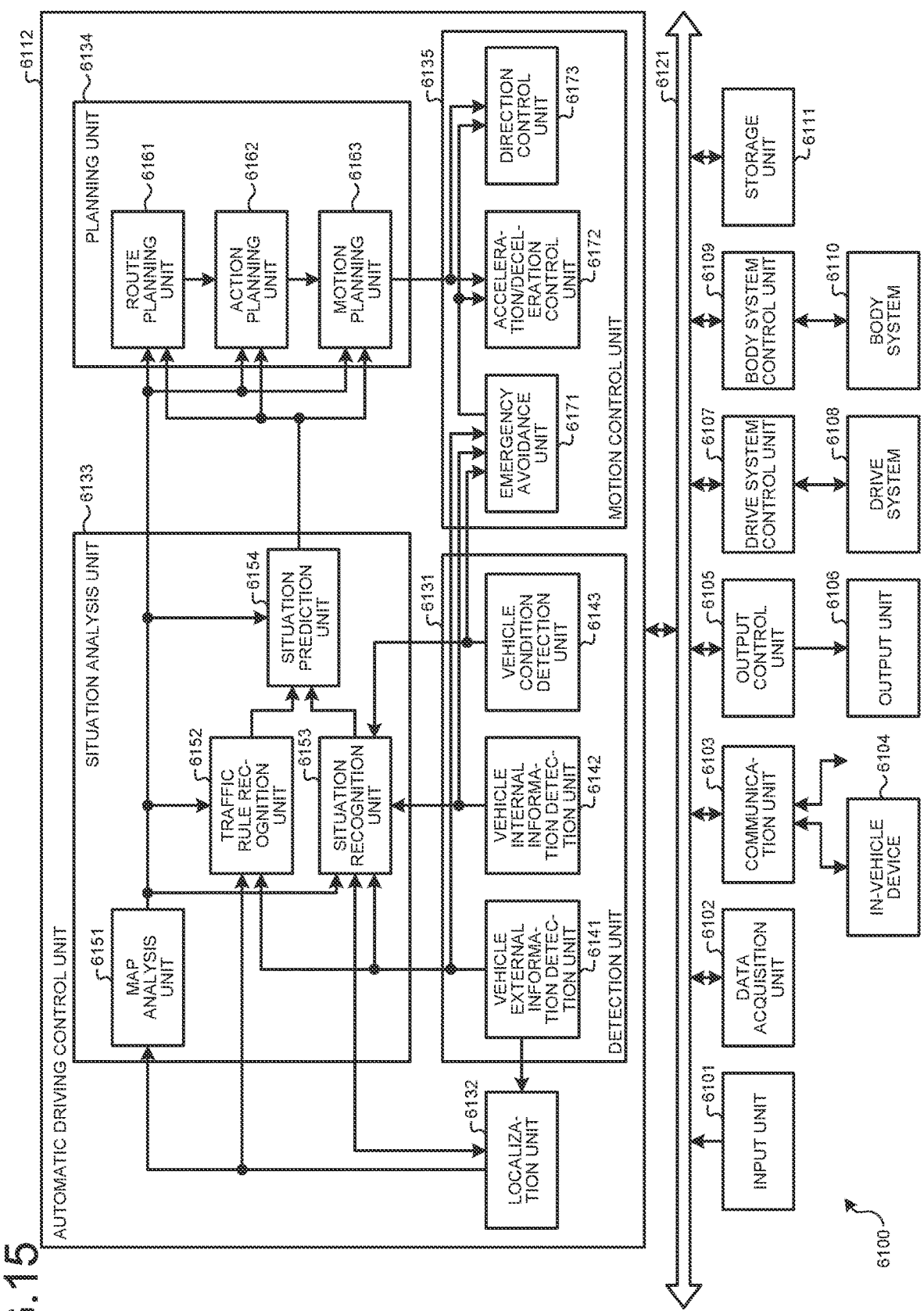
FIG. 15 is a schematic block diagram illustrating a configuration example of a function of a control system of a vehicle configured to mount an event notification device, applicable to an embodiment.

FIG. 15 is a schematic block diagram illustrating a configuration example of a function of a control system of a vehicle configured to mount the event notification device 10b, applicable to an embodiment. In FIG. 15, a vehicle control system 6100 is a control system mounted to the vehicle to control the operation of the vehicle.

Note that, hereinafter, the vehicle provided with the vehicle control system 6100 is distinguished, as the host vehicle, from other vehicles.

The vehicle control system 6100 includes an input unit 6101, a data acquisition unit 6102, a communication unit 6103, an in-vehicle device 6104, an output control unit 6105, an output unit 6106, a drive system control unit 6107, a drive system 6108, a body system control unit 6109, a body system 6110, a storage unit 6111, and an automatic driving control unit 6112. The input unit 6101, the data acquisition unit 6102, the communication unit 6103, the output control unit 6105, the drive system control unit 6107, the body system control unit 6109, the storage unit 6111, and the automatic driving control unit 6112 are connected to each other via a communication network 6121.

The communication network 6121 includes, for example, an in-vehicle communication network or a bus in conformity with any standard such as controller area network (CAN), local interconnect network (LIN), local area network (LAN), or FlexRay (registered trademark). Note that, in some cases, units of the vehicle control system 6100 may be directly connected without using the communication network 6121.

Note that, hereinafter, when units of the vehicle control system 6100 communicate with each other via the communication network 6121, the description of the communication network 6121 shall be omitted. For example, communication between the input unit 6101 and the automatic driving control unit 6112 via the communication network 6121 is merely described as communication between the input unit 6101 and the automatic driving control unit 6112.

The input unit 6101 includes a device used by an occupant to input various data, instructions, or the like. For example, the input unit 6101 includes an operation device or the like that is configured to receive an input by a method other than manual operation, for example, through an operation device, such as a touch panel, button, microphone, switch, and a lever, or by voice or gesture. Furthermore, for example, the input unit 6101 may be a remote control device using infrared rays or other radio waves, or an externally connected device such as a mobile device or a wearable device corresponding to the operation of the vehicle control system 6100. The input unit 6101 generates an input signal on the basis of data or an instruction input by an occupant and supplies the input signal to each unit of the vehicle control system 6100.

The data acquisition unit 6102 includes various sensors that acquire data used for processing by the vehicle control system 6100 and supplies acquired data to each unit of the vehicle control system 6100.

For example, the data acquisition unit 6102 includes various sensors that detect a host vehicle state and the like. Specifically, for example, the data acquisition unit 6102 includes a gyroscope sensor, an acceleration sensor, an inertial measurement unit (IMU), and a sensor that detects an accelerator pedal operation amount, a brake pedal operation amount, a steering wheel steering angle, an engine speed, motor rotation speed, wheel rotation speed, or the like.

Furthermore, for example, the data acquisition unit 6102 includes various sensors that detect information outside the host vehicle. Specifically, for example, the data acquisition unit 6102 includes an imaging device, such as a time of flight (ToF) camera, stereo camera, monocular camera, infrared camera, and other cameras. Furthermore, for example, the data acquisition unit 6102 includes an environment sensor that detects weather or meteorological phenomenon, and a surrounding information detection sensor that detects an object around the host vehicle. The environment sensor includes, for example, a raindrop sensor, a fog sensor, a sunlight sensor, a snow sensor, and the like. The ambient information detection sensor includes, for example, an ultrasonic sensor, a radar, light detection and ranging, laser imaging detection and ranging (LiDAR), sonar, and the like.

Furthermore, for example, the data acquisition unit 6102 includes various sensors that detect the current position of the host vehicle. Specifically, for example, the data acquisition unit 6102 includes a Global Navigation Satellite System (GNSS) receiver or the like that receives a GNSS signal from a GNSS satellite, and the like.

Furthermore, for example, the data acquisition unit 6102 includes various sensors that detect information inside the vehicle. Specifically, for example, the data acquisition unit 6102 includes an imaging device that images a driver, a biological sensor that detects biological information about the driver, a microphone that collects voice inside a vehicle interior, and the like. The biological sensor is provided, for example, on a seat surface or the steering wheel and detects the biological information about an occupant sitting on a seat or about the driver holding the steering wheel.

For example, for the biological information about the driver, various observable data, such as heart rate, pulse rate, blood flow, respiration, psychosomatic correlation, visual stimulation, brain wave, perspiration state, head posture behavior, eye movement (gaze, blink, saccade, microsaccade, visual fixation, drift, fixed gaze, iris pupil response) are available. The above biological information can be detected by singly or combinedly using potential between predetermined positions on body surface, a signal of blood flow system or the like obtained by contact observation using infrared light, a signal obtained by non-contact observation using microwave, millimeter-wave, or frequency modulation (FM) wave, detection of eye movement by using images of the eye captured by a camera using an infrared wavelength, and further overload-torque measurement information about a steering or pedal steering device that indicates steering response, or the like.

The communication unit 6103 communicates with the in-vehicle device 6104, and various devices, a server, a base station, and the like outside the vehicle, transmits data supplied from each unit of the vehicle control system 6100, and transmits received data to each unit of the vehicle control system 6100. Note that a communication protocol supported by the communication unit 6103 is not particularly limited, and the communication unit 6103 can also support a plurality of types of communication protocols.

For example, the communication unit 6103 wirelessly communicates with the in-vehicle device 6104 by wireless LAN, Bluetooth (registered trademark), Near Field Communication (NFC), wireless USB (WUSB), or the like. Furthermore, for example, the communication unit 6103 communicates with the in-vehicle device 6104 in a wired manner by using a universal serial bus (USB), high-definition multimedia interface (HDMI) (registered trademark), mobile high-definition link (MHL), or the like, via a connection terminal (not illustrated) (and a cable if necessary).

Furthermore, for example, the communication unit 6103 communicates with a device (e.g., an application server or control server) on an external network (e.g., the Internet, a cloud network, or a business-specific network) via the base station or an access point. Furthermore, for example, the communication unit 6103 uses a peer to peer (P2P) technology to communicate with a terminal (e.g., a terminal of a pedestrian or store, or a machine type communication (MTC) terminal) being in the vicinity of the host vehicle Furthermore, for example, the communication unit 6103 performs V2X communication, such as vehicle-to-vehicle communication, vehicle-to-infrastructure communication, vehicle-to-home communication, and pedestrian-to-pedestrian communication. Furthermore, for example, the communication unit 6103 includes a beacon receiving unit, receives a radio wave or electromagnetic wave emitted from a radio station or the like installed on a road, and acquires information about the current position, traffic congestion, traffic regulation, required time, or the like.

The in-vehicle device 6104 includes, for example, a mobile device or wearable device that is held by an occupant, an information device that is carried in or mounted to the host vehicle, a navigation device that searches for a route to any destination, and the like.

The output control unit 6105 controls output of various information to an occupant of the host vehicle or to the outside the vehicle. For example, the output control unit 6105 generates an output signal including at least one of visual information (e.g., image data) and auditory information (e.g., voice data), supplies the output signal to the output unit 6106, and thereby controls the output of visual and auditory information from the output unit 6106.

Specifically, for example, the output control unit 6105 combines image data captured by different imaging devices of the data acquisition unit 6102 to generate an overhead view image, a panoramic image, or the like, and outputs an output signal including the generated image to the output unit 6106. Note that when the overhead view image or panoramic image is generated, depending on usage allowed by a communication band, a more precise event can be reproduced by recording and storing images before combined by the compound-eye camera. Note that the images before combined are recorded and stored depending on storage of permission/rejection information or transmission load.

Furthermore, for example, the output control unit 6105 generates voice data including a warning sound or a warning message about danger, such as collision, contact, or approaching a danger zone, and supplies an output signal including the generated voice data to the output unit 6106.

The output unit 6106 includes a device that is configured to output visual information or auditory information to an occupant of the host vehicle or to the outside of the vehicle. For example, the output unit 6106 includes a display device, an instrument panel, an audio speaker, headphones, a wearable device such as a spectacle-type display worn by an occupant, a projector, a lamp, and the like. The display device of the output unit 6106 may be a device that displays visual information in the driver's field of view, such as a head-up display, a transmissive display, and a device having an augmented reality (AR) display function, in addition to a device having a normal display.

The drive system control unit 6107 generates various control signals, supplies the control signals to the drive system 6108, and thereby controls the drive system 6108. Furthermore, the drive system control unit 6107 supplies control signals to units other than the drive system 6108 as necessary, and notifies of a control status of the drive system 6108, for example.

The drive system 6108 includes various devices relating to the drive system of the host vehicle. For example, the drive system 6108 includes a drive force generation device that generates a drive force for an internal combustion engine or a drive motor, a drive force transmission mechanism that transmits the drive force to wheels, a steering mechanism that adjusts the steering angle, a braking device that generates a braking force, an antilock brake system (ABS), electronic stability control (ESC), an electric power steering device, and the like.

The body system control unit 6109 generates various control signals, supplies the control signals to the body system 6110, and thereby controls the body system 6110. Furthermore, the body system control unit 6109 supplies control signals to units other than the body system 6110 as necessary, and notifies of a control status of the body system 6110, for example.

The body system 6110 includes various devices of the body system mounted in the vehicle body. For example, the body system 6110 includes a keyless entry system, a smart key system, a power window device, a power seat, a steering wheel, an air conditioner, and various lamps (e.g., head lamps, back-up lights, brake lights, indicators, fog lamps, etc.), and the like.

The storage unit 6111 includes, for example, a read only memory (ROM), a random access memory (RAM), a magnetic storage device such as a hard disc drive (HDD), a semiconductor storage device, an optical storage device, a magneto-optical storage device, and the like. The storage unit 6111 stores various programs, data, and the like used by the respective units of the vehicle control system 6100. For example, the storage unit 6111 stores map data including a three-dimensional high-precision map such as a dynamic map, a global map that is less accurate than the high-precision map and covers a wide area, a local map that includes information around the host vehicle, and the like.

The automatic driving control unit 6112 performs control relating to automatic driving such as autonomous driving or driving support. Specifically, for example, the automatic driving control unit 6112 performs cooperative control to achieve the function of advanced driver assistance system (ADAS) including avoiding collision or mitigating impact of the host vehicle, following based on a distance between vehicles, driving while maintaining vehicle speed, warning collision of the host vehicle, warning of lane departure of the host vehicle, and the like. Furthermore, for example, the automatic driving control unit 6112 performs cooperative control for the purpose of, for example, automatic driving that is autonomous driving without the operation of the driver. The automatic driving control unit 6112 includes a detection unit 6131, a localization unit 6132, a situation analysis unit 6133, a planning unit 6134, and a motion control unit 6135.

The detection unit 6131 detects various information necessary for controlling automatic driving. The detection unit 6131 includes a vehicle external information detection unit 6141, a vehicle internal information detection unit 6142, and a vehicle condition detection unit 6143.

The vehicle external information detection unit 6141 performs detection processing for information outside the host vehicle on the basis of data or signals from the respective units of the vehicle control system 6100. For example, the vehicle external information detection unit 6141 performs detection processing, recognition processing, tracking processing, and distance detection processing for an object around the host vehicle. For example, objects to be detected include a vehicles, person, obstacle, structure, roads, traffic lights, traffic signs, road sign, and the like. Furthermore, for example, the vehicle external information detection unit 6141 performs detection processing for the environment around the host vehicle. For example, the surrounding environment to be detected includes weather, temperature, humidity, brightness, road surface condition, and the like. The vehicle external information detection unit 6141 supplies data indicating a result of the detection processing to the localization unit 6132, a map analysis unit 6151, a traffic rule recognition unit 6152, and a situation recognition unit 6153 of the situation analysis unit 6133, an emergency avoidance unit 6171 of the motion control unit 6135, and the like.

The vehicle internal information detection unit 6142 performs detection processing for information inside the vehicle on the basis of data or signals from the respective units of the vehicle control system 6100. For example, the vehicle internal information detection unit 6142 performs authentication processing and recognition processing for the driver, driver's state detection processing, detection processing for an occupant, detection processing for vehicle interior environment, and the like. For example, the driver's state being a detection target includes physical condition, arousal level, concentration level, fatigue level, line-of-sight direction, and the like. For example, the vehicle interior environment being a detection target includes temperature, humidity, brightness, odor, and the like. The vehicle internal information detection unit 6142 supplies data indicating a result of the detection processing to the situation recognition unit 6153 of the situation analysis unit 6133, the emergency avoidance unit 6171 of the motion control unit 6135, and the like.

The vehicle condition detection unit 6143 performs host vehicle state detection processing on the basis of data or signals from the respective units of the vehicle control system 6100. For example, the host vehicle state being a detection target includes speed, acceleration, steering angle, the presence or absence of abnormality, a driving operation status, position and inclination of a power seat, a door lock state, states of other in-vehicle devices, and the like. The vehicle condition detection unit 6143 supplies data indicating a result of the detection processing to the situation recognition unit 6153 of the situation analysis unit 6133, the emergency avoidance unit 6171 of the motion control unit 6135, and the like.

The localization unit 6132 performs estimation processing for the position and attitude of the host vehicle, on the basis of data or signals from the respective units of the vehicle control system 6100, such as the vehicle external information detection unit 6141, and the situation recognition unit 6153 of the situation analysis unit 6133. Furthermore, the localization unit 6132 generates a local map (hereinafter, referred to as a self-position estimation map) used for self-position estimation, if necessary. The self-position estimation map is, for example, a highly accurate map using a technology such as simultaneous localization and mapping (SLAM). The localization unit 6132 supplies data indicating a result of the estimation processing to the map analysis unit 6151, the traffic rule recognition unit 6152, the situation recognition unit 6153, and the like of the situation analysis unit 6133. Furthermore, the localization unit 6132 causes the storage unit 6111 to store the self-position estimation map.

The situation analysis unit 6133 performs analysis processing for the situation of and around the host vehicle. The situation analysis unit 6133 includes the map analysis unit 6151, the traffic rule recognition unit 6152, the situation recognition unit 6153, and a situation prediction unit 6154.

The map analysis unit 6151 performs analysis processing for various maps stored in the storage unit 6111 while using data or signals from the respective units of the vehicle control system 6100, such as the localization unit 6132 and the vehicle external information detection unit 6141 as necessary, and builds a map containing necessary information for automatic driving processing. The map analysis unit 6151 supplies the built map to the traffic rule recognition unit 6152, the situation recognition unit 6153, the situation prediction unit 6154, and a route planning unit 6161, an action planning unit 6162, and a motion planning unit 6163 of the planning unit 6134, and the like.

The traffic rule recognition unit 6152 performs recognition processing for traffic rules around the host vehicle, on the basis of data or signals from the respective units of the vehicle control system 6100, such as the localization unit 6132, the vehicle external information detection unit 6141, and the map analysis unit 6151. By the recognition processing, for example, the positions and states of traffic lights around the host vehicle, the contents of traffic regulation around the host vehicle, a lane along which driving is allowed to drive, and the like are recognized. The traffic rule recognition unit 6152 supplies data indicating a result of the recognition processing to the situation prediction unit 6154 and the like.

The situation recognition unit 6153 performs recognition processing for the host vehicle situation on the basis of data or signals from the respective units of the vehicle control system 6100, such as the localization unit 6132, the vehicle external information detection unit 6141, the vehicle internal information detection unit 6142, the vehicle condition detection unit 6143, and the map analysis unit 6151. For example, the situation recognition unit 6153 performs recognition processing for the host vehicle situation, the situation around the host vehicle, the situation of the driver of the host vehicle, and the like. Furthermore, the situation recognition unit 6153 generates a local map (hereinafter referred to as a situation recognition map) used for recognition of the situation around the host vehicle, if necessary. The situation recognition map is, for example, an occupancy grid map.

For example, the host vehicle situation being a recognition target includes the position, posture, movement (e.g., speed, acceleration, moving direction, etc.) of the host vehicle, the presence/absence and contents of an abnormality, and the like. For example, the situation around the host vehicle, being a recognition target, includes the types and positions of surrounding stationary objects, types, positions, and movements of surrounding moving objects (e.g., speeds, accelerations, moving directions, etc.), the configurations of surrounding roads, road surface condition, and surrounding weather, temperature, humidity, and brightness, and the like. For example, the driver's state being a recognition target includes physical condition, arousal level, concentration level, fatigue level, line-of-sight movement, and driving operation.

The situation recognition unit 6153 supplies data indicating a result of the recognition processing (including the situation recognition map, if necessary) to the localization unit 6132, the situation prediction unit 6154, and the like. Furthermore, the situation recognition unit 6153 causes the storage unit 6111 to store the situation recognition map.

The situation prediction unit 6154 performs situation prediction processing for the host vehicle, on the basis of data or signals from the respective units of the vehicle control system 6100, such as the map analysis unit 6151, the traffic rule recognition unit 6152, and the situation recognition unit 6153. For example, the situation prediction unit 6154 performs prediction processing for the host vehicle situation, the situation around the host vehicle, and the situation of the driver, and the like.

For example, the host vehicle situation being a prediction target includes the behavior of the host vehicle, the occurrence of abnormality, a driving range, and the like. For example, the situation around the host vehicle, being a prediction target, includes the behaviors of moving objects around the host vehicle, a change in signal state, a change in environment such as weather, and the like. For example, the situation of the driver, being a prediction target, includes the behavior and physical condition of the driver, and the like.

The situation prediction unit 6154 supplies data indicating a result of the prediction processing to the route planning unit 6161, the action planning unit 6162, and the motion planning unit 6163 of the planning unit 6134, together with data from the traffic rule recognition unit 6152 and the situation recognition unit 6153.

The route planning unit 6161 plans a route to a destination, on the basis of data or signals from the respective units of the vehicle control system 6100, such as the map analysis unit 6151 and the situation prediction unit 6154. For example, the route planning unit 6161 sets a route from the current position to a specified destination on the basis of the global map. Furthermore, for example, the route planning unit 6161 appropriately changes the route on the basis of traffic congestion, accident, traffic regulation, the situation of construction or the like, and the physical condition of the driver. The route planning unit 6161 supplies data indicating the planned route to the action planning unit 6162 and the like.

The action planning unit 6162 plans the action of the host vehicle to safely drive in a planned time along the route planned by the route planning unit 6161, on the basis of data or signals from the respective units of the vehicle control system 6100, such as the map analysis unit 6151 and the situation prediction unit 6154. For example, the action planning unit 6162 plans starting, stopping, traveling direction (e.g., forward, backward, left turn, right turn, change in direction, etc.), driving lane, driving speed, overtaking, and the like. The action planning unit 6162 supplies data indicating the planned action of the host vehicle to the motion planning unit 6163 and the like.

The motion planning unit 6163 plans the motion of the host vehicle to achieve the action planned by the action planning unit 6162, on the basis of data or signals from the respective units of the vehicle control system 6100, such as the map analysis unit 6151 and the situation prediction unit 6154. For example, the motion planning unit 6163 plans acceleration, deceleration, a traveling trajectory, and the like. The motion planning unit 6163 supplies data indicating the planned motion of the host vehicle to a acceleration/deceleration control unit 6172, a direction control unit 6173, and the like of the motion control unit 6135.

The motion control unit 6135 controls the motion of the host vehicle. The motion control unit 6135 includes the emergency avoidance unit 6171, the acceleration/deceleration control unit 6172, and the direction control unit 6173.

On the basis of a result of the detection by the vehicle external information detection unit 6141, the vehicle internal information detection unit 6142, and the vehicle condition detection unit 6143, the emergency avoidance unit 6171 performs detection processing for an emergency situation, such as collision, contact, approaching a danger zone, abnormal state of the driver, abnormal condition of the vehicle. When the emergency avoidance unit 6171 detects the occurrence of an emergency situation, the emergency avoidance unit 6171 plans the motion of the host vehicle to avoid the emergency situation such as a sudden stop or a sharp turn. The emergency avoidance unit 6171 supplies data indicating the planned motion of the host vehicle to the acceleration/deceleration control unit 6172, the direction control unit 6173, and the like.

The acceleration/deceleration control unit 6172 performs acceleration/deceleration control for achieving the motion of the host vehicle that is planned by the motion planning unit 6163 or the emergency avoidance unit 6171. For example, the acceleration/deceleration control unit 6172 calculates the control target value of the drive force generation device or a braking device to achieve the planned acceleration, deceleration, or sudden stop, and supplies a control command indicating the calculated control target value to the drive system control unit 6107.

The direction control unit 6173 performs direction control for achieving the motion of the host vehicle planned by the motion planning unit 6163 or the emergency avoidance unit 6171. For example, the direction control unit 6173 calculates the control target value of the steering mechanism to achieve the driving trajectory or the sharp turn planned by the motion planning unit 6163 or the emergency avoidance unit 6171, and supplies a control command indicating the calculated control target value to the drive system control unit 6107.

The above-mentioned event notification device 10*b* is mounted to the body of the vehicle with a predetermined attachment, and is connected to, for example, the communication unit 6103. In other words, it can be considered that the information processing device 10*d* is a terminal device that communicates with the automatic driving control unit 6112 and the like via the communication unit 6103. The event notification device 10*b* is configured to acquire information about the vehicle via the communication unit 6103. For example, it can be considered that the event notification device 10*b* acquires information usable for inputting a trigger to the trigger input unit 1109 from the detection unit 6131 via the communication unit 6103.

FIG. 16 is a diagram illustrating an example of installation positions of the imaging devices of the data acquisition unit 6102. a imaging units 7910, 7912, 7914, 7916, and 7918 to which the imaging devices are applicable are each provided at, for example, at least one of the front nose, side mirrors, rear bumper, back door of a vehicle 7900, and an upper portion of the windshield on the vehicle interior side. The imaging unit 7910 provided at the front nose and the imaging unit 7918 provided at the upper portion of the windshield on the vehicle interior side each mainly acquire a forward image from the vehicle 7900. The imaging units 7912 and 7914 provided at the side mirrors each mainly acquire a side image on side of the vehicle 7900. The imaging unit 7916 provided at the rear bumper or the back door mainly acquires a rearward image from the vehicle 7900. The imaging unit 7918 provided at the upper portion of the windshield on the vehicle interior side is mainly used to detect a preceding vehicle, pedestrian, obstacle, traffic light, traffic sign, lane, or the like.

Note that FIG. 16 illustrates an example of imaging ranges of the imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the respective side mirrors, and an imaging range d indicates an imaging range of the imaging unit 7916 provided at the rear bumper or back door. For example, by superimposing image data captured by the imaging units 7910, 7912, 7914, and 7916, an overhead view image of the vehicle 7900 as viewed from above can be obtained.

The event notification device 10*b* acquires images captured by these imaging units 7910, 7912, 7914, and 7916 via the communication unit 6103, analyzes the acquired images, and thus, detects abnormal approach or tailgating of another vehicle.

A vehicle external information detection units 7920, 7922, 7924, 7926, 7928, and 7930 each provided at the front, rear, sides, corners of the vehicle 7900 and at an upper portion of the windshield on the vehicle interior side may be, for example, an ultrasonic sensor or a radar device. The vehicle external information detection units 7920, 7926, and 7930 provided at the front nose, rear bumper, back door, and the upper portion of the windshield on the vehicle interior side of the vehicle 7900 may be, for example, a LiDAR device. These vehicle external information detection units 7920 to 7930 are mainly used to detect a preceding vehicle, pedestrian, obstacle, or the like.

Note that the effects described herein are merely examples, the present invention is not limited to these effects, and other effects may also be provided.

Note that the present technology can also have the following configurations.

(1) An information processing device comprising:
   a detection unit that detects an event;
   a determination unit that determines a level of an event detected by the detection unit; and
   a transmission unit that transmits information according to the level determined by the determination unit to a first communication device.
(2) The information processing device according to (1), wherein
   the transmission unit
   transmits the information to the first communication device, the information including an instruction for transmission of the information to a second communication device.
(3) The information processing device according to (1) or (2), wherein
   the transmission unit
   transmits the information to the first communication device, the information including an instruction requesting an emergency dispatch.
(4) The information processing device according to (2), wherein
   the transmission unit
   transmits the information to the first communication device, the information including an instruction for the first communication device or the second communication device to capture an image and record the image.
(5) The information processing device according to (4), wherein
   the transmission unit
   transmits to the first communication device the instruction for recording the image, the instruction including an instruction on how to record the image.
(6) The information processing device according to any one of (1) to (5), wherein
   the transmission unit
   transmits the information to the first communication device, the information including identification information to identify the event.
(7) The information processing device according to (4) or (5), wherein
   the transmission unit
   transmits the information to the first communication device, the information including an instruction about specifying a storage period of the image.
(8) The information processing device according to any one to (1) to (7), wherein
   the transmission unit
   transmits the information with top priority by a communication method by which the transmission unit transmits the information.
(9) The information processing device according to any one of (4), (5), and (7), wherein
   the transmission unit
   encrypts the image according to the level and transmits the image to the first communication device.
(10) The information processing device according to (1), further comprising
   an imaging unit that captures an image and outputs the image, wherein
   the transmission unit
   transmits the image output from the imaging unit in response to transmission of the information.
(11) The information processing device according to any one of (1) to (10), wherein
   the transmission unit
   when a function of transmitting the information to the first communication device is disabled, stores the information invisibly.
(12) The information processing device according to any one of (1) to (11), wherein
   the information processing device is held and used by a user, and
   the detection unit
   detects the event according to the user's operation.

(13) The information processing device according to any one of (1) to (11), wherein
the information processing device is mounted to a mobile object and used,
the detection unit
detects the event in response to an output from a detection unit that detects a state around the mobile object.
(14) The information processing device according to carry one of (1) to (11), further comprising
a reception unit that receives the information, wherein
the detection unit
detects the event according to the information received by the reception unit.
(15) The information processing device according to any one of (1) to (14), wherein
the transmission unit
transmits the information to the first communication device, the information including information about the information processing device.
(16) A terminal device comprising:
a detection unit that detects an event;
a determination unit that determines a level of an event detected by the detection unit;
a transmission unit that transmits information according to the level determined by the determination unit to a first communication device; and
a mounting portion that is used to mount the terminal device to a mobile object.
(17) An information processing method comprising:
a detection step of detecting an event;
a determination step of determining a level of an event detected by the detection unit; and
a transmission step of transmitting information according to the level determined by the determination unit to a first communication device.
(18) An information processing program causing a computer to execute:
a detection step of detecting an event;
a determination step of determining a level of an event detected by the detection unit; and
a transmission step of transmitting information according to the level determined by the determination unit to a first communication device.

REFERENCE SIGNS LIST

1 INFORMATION PROCESSING SYSTEM
2 NETWORK
10, 10a, 10b EVENT NOTIFICATION DEVICE
20, 20a, 20b, 20b', 20c, 20d, 20e, 20f, 20g, 20s, $20t_1$, $20t_2$ INFORMATION PROCESSING DEVICE
21a, 21b SHORT-RANGE COMMUNICATION I/F
22 PACKET DECODER
23 PACKET CLASSIFICATION UNIT
30 BASE STATION
40 REGIONAL SERVER
41 MOBILE-PHONE BASE STATION
43 REGIONAL TRANSPORT/SECURITY MONITORING CLOUD
200 SHORT-RANGE COMMUNICATION RECEPTION UNIT
201 MESSAGE DECODER
202 COMMUNICATION CONTROL UNIT
203 START INSTRUCTION UNIT
204 EVENT EXTRACTION UNIT
206 MESSAGE ANALYSIS UNIT
207 ISSUANCE INFORMATION GENERATION UNIT
208 ENCRYPTION/TRANSMISSION REQUEST UNIT
211 BUFFER
212 CANCEL SETTING STORAGE UNIT

The invention claimed is:

1. An information processing device, comprising:
a detection unit configured to detect an event;
a determination unit configured to determine whether a level of the detected event is higher than a threshold or lower than the threshold; and
a transmission unit configured to:
transmit information based on the level to a first communication device, wherein
the information includes a hop count,
the hop count is a number of communication devices through which the information is transmitted from the information processing device, and
the communication devices include the first communication device; and
transmit an image to the first communication device in response to the transmission of the information, wherein
the transmitted image is encrypted when the level of the detected event is lower than the threshold, and
the transmitted image is not encrypted when the level of the detected event is higher than the threshold.

2. The information processing device according to claim 1, wherein
the information further includes a first instruction for transmission of the information to a second communication device, and
the second communication device is included in the communication devices.

3. The information processing device according to claim 1, wherein the information further includes an instruction requesting an emergency dispatch.

4. The information processing device according to claim 2, wherein the information further includes a second instruction for one of the first communication device or the second communication device to capture the image and record the image.

5. The information processing device according to claim 4, wherein the second instruction is on how to record the image.

6. The information processing device according to claim 1, wherein the information further includes identification information to identify the event.

7. The information processing device according to claim 4, wherein the information further includes a third instruction about specifying a storage period of the image.

8. The information processing device according to claim 1, wherein the information is transmitted with top priority by a communication method by which the transmission unit is configured to transmit the information.

9. The information processing device according to claim 1, further comprising an imaging unit configured to:
capture the image; and
output the image.

10. The information processing device according to claim 1, wherein
the transmission unit is further configured to store the information invisibly, when a function of the transmission of the information to the first communication device is disabled, and
the information is invisibly stored by setting the information to restrict access by a user.

11. The information processing device according to claim 1, wherein
the information processing device is held and used by a user, and
the detection unit is further configured to detect the event based on a user operation.

12. The information processing device according to claim 1, wherein
the information processing device is mounted to a mobile object and used, and
the detection unit is further configured to:
detect a state around the mobile object; and
detect the event in response to an output from the detection of the state around the mobile object.

13. The information processing device according to claim 1, further comprising a reception unit configured to receive the information, wherein
the detection unit is further configured to detect the event based on the received information.

14. The information processing device according to claim 1, wherein the information further includes information about the information processing device.

15. A terminal device, comprising:
a detection unit configured to detect an event;
a determination unit configured to determine whether a level of the detected event is higher than a threshold or lower than the threshold;
a transmission unit configured to:
transmit information based on the level to a first communication device, wherein
the information includes a hop count,
the hop count is a number of communication devices through which the information is transmitted from the terminal device, and
the communication devices include the first communication device; and
transmit an image to the first communication device in response to the transmission of the information, wherein
the transmitted image is encrypted when the level of the detected event is lower than the threshold, and
the transmitted image is not encrypted when the level of the detected event is higher than the threshold; and
a mounting portion configured to mount the terminal device to a mobile object.

16. An information processing method, comprising:
detecting an event;
determining whether a level of the detected event is higher than a threshold or lower than the threshold;
transmitting information based on the level to a first communication device, wherein
the information includes a hop count,
the hop count is a number of communication devices through which the information is transmitted from an information processing device, and
the communication devices include the first communication device; and
transmitting an image to the first communication device in response to the transmission of the information, wherein
the transmitted image is encrypted when the level of the detected event is lower than the threshold, and
the transmitted image is not encrypted when the level of the detected event is higher than the threshold.

17. A non-transitory computer-readable medium having stored thereon, computer-executable instructions which, when executed by a processor, cause the processor to execute operations, the operations comprising:
detecting an event;
determining whether a level of the detected event is higher than a threshold or lower than the threshold;
transmitting information based on the level to a first communication device, wherein
the information includes a hop count,
the hop count is a number of communication devices through which the information is transmitted from an information processing device, and
the communication devices include the first communication device; and
transmitting an image to the first communication device in response to the transmission of the information, wherein
the transmitted image is encrypted when the level of the detected event is lower than the threshold, and
the transmitted image is not encrypted when the level of the detected event is higher than the threshold.

18. The information processing device according to claim 1, wherein
the information further includes position information indicating a current position of the information processing device and time information indicating a specific time when the event is detected, and
the determination unit is further configured to obtain an information attenuation rate based on at least one of the position information or the time information.

* * * * *